(12) United States Patent
Skarzenski et al.

(10) Patent No.: US 8,291,730 B2
(45) Date of Patent: Oct. 23, 2012

(54) SPINNER FOR MANUFACTURING DUAL-COMPONENT IRREGULARLY-SHAPED HOLLOW INSULATION FIBER

(75) Inventors: Joseph Skarzenski, Ottawa (CA); Witold S. Czastkiewicz, Ottawa (CA); Erkki Paivinen, Ottawa (CA); Stan Banaszkiewicz, Ottawa (CA)

(73) Assignee: Certainteed Insulation Canada, Inc., Toronto (CA)

( * ) Notice: Subject to any disclaimer, the term of this patent is extended or adjusted under 35 U.S.C. 154(b) by 519 days.

(21) Appl. No.: 12/262,352

(22) Filed: Oct. 31, 2008

(65) Prior Publication Data

US 2009/0320528 A1    Dec. 31, 2009

(30) Foreign Application Priority Data

Jun. 25, 2008 (CA) ..................... 2636098

(51) Int. Cl.
*C03B 37/04* (2006.01)
(52) U.S. Cl. ................ 65/521; 65/459; 65/502; 65/470; 264/8; 425/8
(58) Field of Classification Search ............... 65/521, 65/522, 502, 459, 470, 516, 518, 519; 264/8; 425/8
See application file for complete search history.

(56) References Cited

U.S. PATENT DOCUMENTS

| | | |
|---|---|---|
| 1,219,709 A | 3/1917 | Danner |
| 1,571,216 A | 2/1926 | Soubier |
| 1,574,482 A | 2/1926 | Hirsch |
| 1,750,972 A | 3/1930 | Soubier |
| 1,926,410 A | 9/1933 | Soubier |
| 1,926,905 A | 9/1933 | Le Coultre |
| 1,933,341 A | 10/1933 | Richardson |
| 1,975,737 A | 10/1934 | Leopoldo |
| 2,009,793 A | 7/1935 | Leopoldo |
| 2,269,459 A | 1/1942 | Kleist |
| 2,765,586 A | 10/1956 | Wilson |
| 2,927,621 A | 3/1960 | Games et al. |
| 2,998,620 A | 9/1961 | Stalego |
| 3,063,268 A | 11/1962 | Kniseley |
| 3,073,005 A | 1/1963 | Tiede |
| 3,257,183 A | 6/1966 | Newark |
| 3,268,313 A | 8/1966 | Burgman et al. |
| 3,421,873 A | 1/1969 | Burgman et al. |
| 3,510,393 A | 5/1970 | Burgman et al. |
| 3,528,128 A | 9/1970 | Murakami et al. |

(Continued)

*Primary Examiner* — Matthew Daniels
*Assistant Examiner* — Lisa Herring
(74) *Attorney, Agent, or Firm* — Abel Law Group LLP; Alexander H. Place

(57) ABSTRACT

A novel spinner, for fiberizing hollow, irregularly-shaped insulating fibers is the subject matter of the present invention. The spinner is unique in a sense that its hole/slot pattern can be done by some standard drilling/milling techniques, which lower the cost of manufacturing. The invention uses two molten glasses (A and B) of different coefficients of thermal expansion, which are moved outwardly around the corresponding gas orifices by centrifugal force in a spinner pot. A stream of pressurized combustion gases is thrust through these central gas orifices to produce a hollow, non collapsible fiber of irregular shape. Molten glass A is introduced from the bottom of the spinner, and molten glass B is introduced above an uppermost flange and by means of centrifugal force, the two glasses A and B are forced upwardly and downwardly, respectively, into fiberizing centers. The improvement of the present invention is that by using both horizontal baffles and vertical compartments, a greater number of fiberizing orifices can be created on the spinner outside peripheral side wall.

6 Claims, 20 Drawing Sheets

U.S. PATENT DOCUMENTS

| | | |
|---|---|---|
| 3,772,137 A | 11/1973 | Tolliver |
| 4,039,718 A | 8/1977 | Kallenborn |
| 4,228,206 A | 10/1980 | Fabisak |
| 4,483,903 A | 11/1984 | Reinehr et al. |
| 4,518,408 A | 5/1985 | Bhatti |
| 4,620,859 A | 11/1986 | Lin et al. |
| 4,698,082 A | 10/1987 | Jensen |
| 4,704,149 A | 11/1987 | Palamara |
| 4,717,607 A | 1/1988 | Pfizenmaier et al. |
| 4,846,864 A | 7/1989 | Huey |
| 4,850,847 A | 7/1989 | Samuelson |
| 5,080,705 A | 1/1992 | Ott et al. |
| 5,213,599 A | 5/1993 | Geertman et al. |
| 5,482,527 A * | 1/1996 | Czastkiewicz .................. 65/502 |
| 5,509,953 A * | 4/1996 | Gavin ............................ 65/502 |
| 5,622,671 A | 4/1997 | Pellegrin et al. |
| 5,647,883 A * | 7/1997 | Houpt et al. ................... 65/494 |
| 5,674,307 A | 10/1997 | Huey et al. |
| 5,743,932 A | 4/1998 | Houpt et al. |
| 5,770,309 A | 6/1998 | Houpt et al. |
| 5,776,223 A | 7/1998 | Huang |
| 6,167,729 B1 * | 1/2001 | Watton et al. ................... 65/497 |
| 7,003,987 B2 * | 2/2006 | Skarzenski et al. ............. 65/521 |

\* cited by examiner

SPINNER FOR MANUFACTURING DUAL-COMPONENT IRREGULARLY-SHAPED HOLLOW INSULATION FIBER

FIELD OF THE INVENTION

This invention is related to a method and apparatus for making, by a rotary process, hollow bi-component irregularly-shaped mineral fiber for use in thermal and acoustical insulation materials. The choice of fiber forming thermoplastic materials includes not only traditional glasses, but also any of the glassy mineral materials, such as rock, slag, and basalt.

The apparatus includes a spinner for making dual-component, irregularly-shaped, hollow insulation glass fiber, for thermal and/or acoustical insulation purposes. Also, a single-component (single glass, straight hollow fibre) is considered to be part of this invention.

This invention also includes a concept for spinning hollow fibers of other thermoplastic materials, such as polyester.

A. GENERAL BACKGROUND

Typical, commercially available, glass fiber thermal and acoustical insulation comprises solid, single-glass, straight, and relatively short glass fibers, made by a rotary fiberizing process. A single molten glass composition is forced through the plurality of orifices in the spinner peripheral wall and primary fibers are produced. These are further attenuated by an annular main burner and compressed-air blower combined actions. A binder is sprayed onto the fibers as they are drawn downwards. The fibers are collected on a foraminous conveyor with bottom suction and then, as wool pack, fed into the curing oven for thermal processing (drying and binder thermal setting).

Light density, small diameter glass fibers about 5 microns average diameter are properly assembled into a three-dimensional fibrous lattice or structure, commonly referred to as a wool pack or web.

Light density glass fiber insulation product is highly compressible and resilient. The air content of a light density, 0.7-pcf, glass fibre insulation product approaches 96% vol. (0.7-pcf product, glass density=160 pcf (2,560 kg/m$^3$), glass volume percent=(0.7/160)*100%=4.4%, air content (volumetric percent)=95.6%.

Spatial fibrous lattice is effective in trapping air between fibers, and prevents any air flow. The convective mode of heat transfer is therefore virtually eliminated. Heat can still be transferred through stagnant air by conduction but it is not an effective way of heat transport. Thermal conductivity of air is only 0.023 W/(m*K), and for light density glass fiber insulation it is the thermal resistance of still (stagnant) air trapped inside the three-dimensional fibrous structure (matrix) that determines the ability of insulation product to retard heat transfer. As the product density goes up, the solid conduction through the glass fibrous lattice starts to become a factor, since glass thermal conductivity is 0.800 W/(m*K), i.e. 30-times more than that of still air.

The fine fiber lattice retards heat transfer also by scattering radiation. The more uniform fiber spatial distribution and the higher the fiber surface area (finer fiber), the more intense radiation scattering, and the better thermal insulating capability.

Insulating materials generally rely on entrapped still air for the majority of their insulating qualities; the thermal conductivities for commonly used insulating materials typically lie in the range of 0.018 to 0.046 W/(m*K) for insulating product in a dry state. If water or water vapor enters the insulant, its thermal conductivity will increase significantly. Water has a very detrimental effect on insulating material ability to resist heat flow. The thermal conductivity of water is 0.580 W/(m*K). The K-value of light density fibrous insulation materials can increase by 35% with only 1.5% moisture entering into the material.

The open structure of fibrous insulating materials provides little resistance to water or water vapor penetration. Closed cell insulants are, certainly, less sensitive to water penetration; however plastic (polyethylene) film vapor barriers are used when fiberglass insulation is installed in residential homes.

The apparent thermal conductivity of a typical insulating material somewhat exceeds the thermal conductivity of the gaseous medium itself, i.e. the gaseous medium which is made stagnant inside the insulating material body. Thermal conductivity of still gas is considered to be the lower limit. Wood (dry) thermal conductivity is λ=0.400 W/(m*K), magnesia MgO insulation=0.070, cork=0.070, saw dust=0.060, paper=0.050, wool=0.050, foam glass=0.045, rockwool=0.045, glass wool (fiberglass)=0.040, kapok insulation=0.034, expanded polystyrene=0.030, cotton=0.030 and still air=0.026. Thermal conductivity λ of water is 0.600 W(m*K), for glass, the λ numerical value is 0.800 W/(m*K). Thermal conductivity of carbon steel is 54 W/(m*K).

Since the apparent thermal conductivity of insulating material depends on the thermal conductivity of the gas, the obvious approach to lower the overall thermal conductivity of insulation material is to reduce the thermal conductivity of the gas, either by lowering the gas pressure (vacuum), or using gases with thermal conductivities lower than that of air. Some gases of potential interest include (the relative thermal conductivities, with respect to air, given in brackets, air=1.000): argon Ar (0.677), ethane $C_2H_6$ (0.750), propane $C_3H_8$ (0.615), carbon dioxide $CO_2$ (0.620), hexafluorosulfide $SF_6$ (0.500). Some of these gases (hydrocarbons) are flammable, so their consideration is rather doubtful. This approach is used in practice to make closed cell insulations (foamed plastics and foam glass).

As previously mentioned, air has very low thermal conductivity, and some other gases, such as carbon dioxide and Freon, have even lower thermal conductivities. The problem with gases is that they are subject to convection currents, and they are transparent to infrared radiation. Gases need to be contained within a structure to prevent convection taking place and to block heat transmission by infrared radiation, if the advantage of low thermal conductivity of "still" gas is to be achieved.

Until the early 1900's, it was thought that the only way to provide a thermal insulation with a lower thermal conductivity than still gas (air) would involve the use of a vacuum. Around 1920 a theory was developed for a method of making an insulation material which could have a thermal conductivity lower than still gas. The governing idea was to prevent the collision between hot and cold gas molecules by creating some extremely thin solid barriers, separated by a distance smaller than a gas molecule mean free path. In the case of air at 0° C. the mean free path is 60*10$^{-9}$ m.

This imagined structure became reality in 1940's when Samuel Kittler from Monsanto, produced a silica aerogel. The silica chains provided the barriers needed to give the microporous structure for an insulation material with a thermal conductivity lower than that of still air. The silica was ground to a powder and sold as a pourable insulation under the Monsanto trade-names Santocel A™ and Santocel C™ from the 1940's to about 1970.

Lower cost silicas, known as pyrogenix or fumed silicas, were later produced by burning silicon tetrachloride in the presence of hydrogen. In the 1950's, the first handleable microporous block-type insulation was made by Johns-Manville for nuclear and aerospace applications. The product was called Min-K™, and comprised Santocel™ silica. These were reinforced with asbestos fibre, and bonded with organic resin. Since then some further improvements were made in the microporous insulation manufacturing process, eliminating the use of asbestos and organic resin. An opacifying powder was uniformly distributed throughout the silica structure to reflect, refract or absorb infra-red radiation. Thermally stable metal oxide opacifyers of particle size comparable to the wavelength of incident radiation, scatter (back-scatter) the infra-red radiation, and therefore still further reduce the radiative heat transfer.

Silica aerogel density can be as low as 3 kg/m3. Water density equals 1,000 kg/m3. Granular aerogels have only a small point of contact between granules in an aerogel bed, and thus the result is an extremely low solid conductivity component. The radiative mode of energy transport can be suppressed by adding a second component to either absorb or scatter (reflect) the incident infra-red (thermal) radiation. Elemental carbon (carbon black) is an effective infrared radiation absorber.

A typical silica aerogel has a total thermal conductivity of 0.017 W/(m*K), i.e., R10/inch; for vacuum, aerogel (50 Torr) thermal conductivity can be lowered to 0.008 W/(m*K), R20/inch. At ambient pressure, a 9% wt. carbon black addition lowers the thermal conductivity from 0.017 to 0.014 W/(m*K). If gas pressure is reduced to 50 Torr, the aerogel thermal conductivity can be as low as 0.004 W/(m*K).

PRIOR ART

Insulation material (glass wool) is more than two times less effective in resisting the flow of heat than the silica aerogel material. The k-value versus density best fit (regression) curve gives for the 0.5-pcf product the k-value of 0.328 (Btu in)/(hr ft$^{2o}$ F.), which translates to $\lambda$=0.047 W/(m*K), slightly lower lambda for higher density product densities, solid glass fibre, 5 to 6 microns average fibre diameter; the $\lambda$ value for silica aerogel is 0.017 W/(m*K).

The operational principle of silica aerogel is not directly applicable to fiberglass insulation as such, but the approach to reduce the radiative component of heat transfer is of potential interest, particularly by increasing the back-scattering of infra-red radiation. Silica aerogels are reasonably transparent in the infra-red (especially between 3 to 5 microns wavelength).

One study (C. Langlais et al. "Influence of the Chemical Composition of Glass on Heat Transfer through Glass Fibre Insulations in Relation to their Morphology and Temperature of Use", 1991, Proc. First ESG Conf and Fundamentals of Manufacturing Process, Sheffield, 9-12 September) shows that the apparent thermal conductivity $\lambda$ of fiberglass insulation product decreases with product density $\rho$ up to about the density of 60 kg/m$^3$ (4 pcf), then gradually increases, mostly due to the solid conduction through fiber structure.

Total or apparent thermal conductivity $\lambda$ of fiberglass insulation product can be split into three separate components, namely: thermal conductivity through gas, which does not really depend on the product density $\rho$, a constant A; thermal conductivity through the solid fibre structure, basically proportional to the product density $\rho$, $B\rho$; and thermal radiation through the fiber structure, which, in principle, is inversely proportional to the product density $\rho$, C/$\rho$:

total thermal conductivity of fiberglass insulation product: $\lambda = A + B\rho + C/\rho$ where A, B, C are constants, and $\rho$=fibrous insulation product density.

The general $\lambda$ versus density graph, for glass fibre insulation and based on Saint-Gobain studies, is shown in Appendix 1. Appendix 2 shows how particular mechanisms of heat transfer contribute to the total thermal conductivity $\lambda$ of glass fibre insulation product, namely:

conduction through gas (still air)=$A$(0.028 W/(m*K)

conduction through solid (fibre lattice)=$B\rho$ radiation through fibrous structure=$C/\rho$ Heat transfer by radiation is particularly significant at low product densities $\rho$. For example a 25 kg/m$^3$ product has total thermal conductivity of 0.038 W/(m*K). Gas (still air) conductivity is 0.028 W/(m*K). Solid thermal conductivity is negligible, so the thermal conductivity due to radiation is about 0.010 W/(m*K), i.e., about 25% of total thermal conductivity. For a 0.7 pcf (11.2 kg/m3) light density home insulation product the numbers are as follows: total thermal conductivity=0.046 W/(m*K), thermal conductivity due to radiation=0.019 W/(m*K), so 41% of total. Taking into account steep, hyperbolic relationship between thermal conductivity due to radiation and product density, it becomes apparent that if one considers even lower density products, a 0.5-pcf (8 kg/m3) product, the contribution of thermal conductivity due to radiation can reach 50% of total thermal conductivity for this 0.5-pcf product density. All these results were obtained for a straight and solid glass fiber.

It is a well known fact in glass wool manufacturing that product density reduction has tremendous impact on production profitability which is the single most important profit booster. Production capacity increase is the other big one. Relatively small density reductions can result in quite substantial profit increases. Consider the following quick estimation:

x product units manufactured
y dollars per unit of product is product selling price
profit level before density reduction assumed to be 25%
realized product density reduction=5%
production increase due to a 5% density reduction=1/0.95=1.05
profit level on extra made product due to density reduction assumed to be 90%
profit level before density reduction equals to (x*y*0.25)
profit after to profit before density reduction ratio equals:

(x*y*0.25+0.05*x*0.90)/(x*y*0.25)=1.18 for this particular case, a 5% product density reduction translates to a 18% increase in realized profit.

There is no point in arguing to what extent these numbers model the real economic environment. The point above is to show what potential density reduction has on production economics.

Light density insulation products (home or residential insulation) constitutes the substantial fraction of overall sales; R-20 or R-19 products, with densities around 0.7-pcf are strong enough mechanically to be considered as potential targets for density reduction. At these low product densities, thermal conductivity due to radiation can account for 40% of the total thermal conductivity. Lowering radiative thermal conductivity $\lambda_{rad}$ can be quite effective in reducing the total thermal conductivity of insulation product. The problem is that it can not be done simply by the density increase. The objective is to reduce density rather than increase it. One possible option is to add some extra reflection to the fibrous structure. This can positively influence the insulation thermal effectiveness by making the insulation material less transparent to thermal (infra-red) radiation. The higher the temperature, and the temperature difference, the more effective high reflection becomes in resisting the flow of heat by radiative mode of heat transfer.

U.S. Pat. No. 4,518,408 (Owens-Corning) gives the following formula for the radiative thermal conductivity $K_{rad}$ of the fiberglass insulation pack:

$$(1/K_{rad})=(A\rho\phi/(\phi^2+\gamma^2))+B, \text{ where:}$$

A, B are constants, $\rho$ is the wool pack density, $\phi$ is the mean fibre diameter, $\gamma$ is the fiber diameter distribution parameter (the standard deviation from the mean fiber diameter).

The lower mean fiber diameter $\phi$, the lower fiber diameter standard deviation $\gamma$, and the higher product density $\rho$, the lower wool pack radiative thermal conductivity $K_{rad}$. If the constant B=0, and the fiber diameter standard deviation y happens to be so small it can be neglected, the radiative thermal conductivity equation simplifies to: $k_{rad}=A\rho/\phi$ for a given diameter $\phi$, and $A/\phi$ designated as C, this formula assumes the form $C/\rho$, the same as given by Langlais (Saint-Gobain).

The k-value goes down with the product density at least up to a 1.7-pcf density. Beyond that, k-value starts to increase with density. Since gas conduction is independent of product density, and conduction through the solid fibre structure increases with density, the effect of lowering thermal conductivity with density, observed for low density insulation products, has to be attributed to the increased thermal radiation blockage by a more compact fibre structure.

For a given fiber fineness (diameter), and a given product density, one can attempt to make a fibrous product structure less transparent to the thermal or infra-red radiation. In other words, reduce the product radiation thermal conductivity, by increasing the degree of reflection or back-scatter of thermal radiation inside the fibrous product body.

Radiative thermal conductivity of fiberglass insulation is inversely proportional to product density for low density products. For example, the more glass material per unit of product volume, the lower the radiative thermal conductivity of insulation material. Although conveniently expressed by mass, or product density, it is not the mass or product density; however it is the number of individual fibers per unit volume of product.

A reasonably uniform spatial distribution and proper spatial orientation are the key factors responsible for thermal and mechanical properties of fibrous insulation. A specific surface area of fiber lattice, i.e. surface area of fiber lattice per unit volume of product, is proportional to product density and inversely proportional to fiber diameter. This large solid-gas contact area, uniformly distributed over the insulation material entire volume, is what makes this fibrous structure highly effective in retarding the heat flow through it.

Large thermal radiation emitting and absorbing glass fibre surface area, uniformly distributed over the entire thickness of fibrous insulation material, can be considered as a multiple radiation shield system with the same emissivity $\in$ (0.9 or more) for each radiation shield. If one wishes to reduce the radiative heat transfer through the given thickness of fibrous insulation, this fibrous layer has to be made more opaque to thermal radiation, i.e. by increased overall back-scattering and back-reflection of the incident infra-red radiation. For example, extra radiation shields can be added. This is actually done in industrial practice simply by increasing the density of light density insulation product, as evidenced by k-value versus density graph, and the well known relationship $\lambda_{rad}=C/\rho$, C being a proportionality constant, and $\rho$ standing for the product density.

Adding density cuts profits, so this approach is not particularly cost effective. For a given fibre diameter, density increase simply means there are more individual fibers to scatter and reflect back incident infrared radiation over the thickness of the insulation product. Raw materials cost money, glass melting (fusing) is an expensive process. To make the potential solution economically attractive, one should consider not escalating these costs.

Hollow Fibers Generally

From a given mass (m) of molten glass one can make n solid fibers of diameter d and length l. Instead of making solid, i.e. full cross-section fibers, one can make hollow fibers, with void fraction $\phi$, and outside diameter d the same as for solid fibers. The average fiber length l can be the same for both solid and hollow fibers. It is obvious that from the same mass m of molten glass one can make more hollow than solid fibers of the same external dimensions; the number of hollow fibers shall be designated $n_\phi$.

$$n_{100}/n=1/(1-\phi)$$

Twice as many hollow fibers, having a void fraction of 50%, can be produced from a given amount of glass as compared to the number of solid fibers of the same size that can be made. As the void fraction increases, the number of hollow fibers that can be produced from the same amount of glass also increases. The number of hollow fibers increases to about ten times as many as solid fibers as their void fractions approach 90%. For a 30% void fraction hollow fiber, the $n_\phi/n$ ratio is slightly more that 1.4. Some commercially available continuous hollow glass fibers have a void fraction of 45-50%. For the same product density one can pack much more hollow fibers than the solid ones into a given volume of insulation product. The resulting hollow fibre product will exhibit better thermal properties. There will be an option of reducing density, since one is not obliged to deliver more thermal insulating value than specified for a given product. It is possible that hollow fibre as such will have somewhat better radiation scattering ability than a solid fiber, but here one is only concerned with the large increase in the number of fibers for a given mass of glass.

Solid fiber has just one, outside surface in contact with air. Hollow fiber has two, the outside as well as the inside, surfaces to interact with air. Hollow fiber seems to be more effective in entrapping air, and preventing convective mode of heat transfer. If $a_{hollow}$ is the interfacial or glass-air contact area per unit volume of insulation product made from hollow fibers, and $a_{solid}$ is the counterpart for solid fibre made product, then the $a_{hollow}/a_{solid}$ ratio is given by the formula:

$$(a_{hollow}/a_{solid})=(d_{solid}/d_{hollow})(\rho_{hollow}/\rho_{solid})(1/(1-\phi^{0.5})), \text{ where:}$$

d is fiber diameter (outside)

$\rho$ stands for insulation product density $\phi$ denotes hollow fibre void fraction For the same fibre diameter d and product density $\rho$ for both the hollow and solid fibers, the $(a_{hollow}/a_{solid})$ exceeds 9, 4 and 2, for $\phi$ equal to 0.8, 0.6 and 0.3, respectively.

Hollow fibers are slightly weaker than their solid counterparts, but not much. It is a well known fact that when it comes to bending or twisting, it is the external portions of beam or shaft cross-section, the parts further away from the neutral axis in the case of bending, which take most of the load, not the central ones.

Insulation products comprising hollow glass fibers are expected to exhibit some improvement in heat flow retarding abilities, as compared to solid glass fiber made insulation materials; for the same R-value product, some density savings can be realized by using hollow fibers.

Hollow Fibers in General

It is well known that some animals living in a cold climate have a layer of hollow fiber hairs to protect them better against body heat loss. For example, Alpaca fiber, a hollow fiber, provides excellent thermal properties within extremely light garments. Compared to wool, an alpaca garment is lighter, more breathable and much warmer. Possums, polar bears, and reindeers all bear hollow shaft fibers.

It is well known that hollow fiber provides some extra warmth to textile products and the same is to be expected with hollow glass fiber made thermal insulation materials.

Hollow Fibers and Profitability

There is not much doubt that hollow glass fiber has some potential in improving thermal performance of insulating product. More importantly however, is the substantial density reductions offered by this type of glass fiber. Density reduction has a profound effect on production profitability. If one can make hollow glass fiber with 50% void fraction, one can sell two times more product for the same size glass melter. Hollow glass fiber with a void fraction of 50% is not unusual.

Shape of the fiber is of particular importance as well. Conventional, single glass composition insulation fiber is more or less straight. Straight glass fiber volume filing capacities are not very good. However, non-straight fibers have much better volume filling capabilities. They offer a more uniform wool pack, with degree of fiber self-interlocking, improved thickness recovery, thermal resistance abilities, and reduced binder material.

Background for Irregularly-Shaped Fibers

It is well known that a non-straight glass fiber provides better volume filling abilities. Numerous attempts have been made in the prior art to make a non-straight glass fiber. Some early attempts involved a mechanical kink process, or passing the fiber through opposed contoured skirts after the fiber has been softened by hot gases (U.S. Pat. No. 2,927,621). Both approaches made use of a single-composition, continuous, and relatively thick glass fiber. These fibers however, are unsuitable for insulation materials.

Later approaches focused on using two distinct glasses with differing thermal expansion coefficients. A non-rotary process for making bi-component curly solid glass fiber is disclosed in U.S. Pat. No. 3,073,005. The rotary process for making curly solid bi-component glass fibers, where two distinct glasses, having different thermal expansion coefficients, are passed in side-by-side contact through orifices of the spinner, is disclosed in U.S. Pat. No. 2,998,620. Since that time, numerous US patents have been issued for making solid bi-component curly (irregularly shaped) fibers.

Irregularly shaped fibers have a natural tendency to self-interlock and form a binder-free, friction-resulting, product cohesion and elastic springiness. They offer the possibility of using a less expensive organic binder material and therefore reducing the raw material cost. Another advantage is that the negative environmental impact of organic compounds will be diminished since smaller amounts of process effluents from the production process have to be treated.

Irregularly-shaped fiber, rather than breaking under applied stress, tends to twist and bend, somewhat like a coil spring, and therefore is able to absorb and store the compression energy. This stored elastic deformation energy is released when the compression is removed, and insulation material exhibits a high degree of springiness and thickness recovery. Higher compressibility is a well appreciated product attribute since it helps to lower the overall packaging, warehouse and shipping costs. For fiberglass insulation products freight cost can exceed 10% of total sales. Irregularly-shaped fibers exhibit a substantially uniform volume filling nature, and provide improved thickness recovery and thermal resistance abilities, even in the absence of a binder material.

Background for Glass Compositions

Two distinct glass compositions, with different coefficients of thermal expansion, are generally used to make irregularly-shaped hollow fibers. There two glass compositions are passed in a side-by-side contact through spinner orifices, and the difference in the coefficient of thermal expansion between the two glass compositions is preferably greater than about $20*10^{-7}$ 1/° C. (2 ppm/° C.), and preferably more than $50*10^{-7}$ 1/° C. (5 ppm/° C.). The coefficients of thermal expansion of glass A and glass B are measured on the individual glasses by standard rod techniques.

The expansion coefficient of glass may be altered materially by change of glass composition. Of greatest influence is alkali. An increase of alkali raises the coefficient markedly. An increase in silica or boric oxide generally lowers the coefficient. Finally, effects of other oxides are intermediate.

The linear expansion coefficient of glass can be calculated with fair accuracy from the glass oxide content by use of appropriate factors; one such method has been given by English and Turner (English, S., Turner, W. E. S., J. Am. Ceram. Soc., 10, 551 (1927); 12, 760 (1929)).

A preferred five component glass composition [weight %] is as follows:

$SiO_2$ . . . 61.0
$Na_2O/K_2O$ . . . 17.5
$Al_2O_3$ . . . 2.7
$B_2O_3$ . . . 6.5

Calculation of linear expansion coefficient (25° C. to 90° C.) for this glass composition according to method of English and Turner (English, S., Turner, W. E. S., J. Am. Ceram. Soc., 10, 551 (1927); 12, 760 (1929)):

| | | |
|---|---|---|
| $SiO_2$ | 61.0 | $61.0 * 0.05 * 10^{-7} = 3.05 * 10^{-7}$ |
| $Na_2O$ | 16.5 | $16.5 * 4.32 * 10^{-7} = 71.28 * 10^{-7}$ |
| $K_2O$ | 1.0 | $1.0 * 3.90 * 10^{-7} = 3.90 * 10^{-7}$ |
| CaO | 10.4 | $10.4 * 1.63 * 10^{-7} = 16.95 * 10^{-7}$ |
| MgO | 1.7 | $1.7 * 0.45 * 10^{-7} = 0.77 * 10^{-7}$ |
| $Al_2O_3$ | 2.7 | $2.7 * 0.14 * 10^{-7} = 0.38 * 10^{-7}$ |
| $B_2O_3$ | 6.5 | $6.5 * (-0.66) * 10^{-7} = -4.29 * 10^{-7}$ |
| This glass composition | | $92.04 * 10^{-7}$ 1/° C. (9.2 app./° C.) |

Note:
valid only for region of 0 to 12% $B_2O_3$

Linear expansion coefficient for some other materials:
cast iron=$120*10^{-7}$ 1/° C. (12 ppm/° C.)
pure silica=$5*10^{-7}$ 1/° C. (0.5 ppm/° C.) for 0 to 300 deg C. (fused silica, Corning #7940)
96% silica glass (Corning Glass #7900*, 96.3% $SiO_2$, 0.2% $Na_2O$, 0.2% $K_2O$, 2.9% $B_2O_3$, 0.4% $Al_2O_3$)=$8*10^{-7}$ 1/° C. (0.8 ppm/° C.) for 0 to 300 deg C. range
borosilicate, low expansion glass (Pyrex #7740™, Corning Glass Works: 80.5% $SiO_2$, 3.8% $Na_2O$, 0.4% $K_2O$, 12.9% $B_2O_3$, 2.2% $Al_2O_3$), chemical and heat resistant glass used for scientific glassblowing. Linear expansion coefficient equals to $18*10^{-7}$ 1/° C. (1.8 ppm/C) (0 to 300 deg C.

average). Other source gives the value of $32.5*10^{-7}$ 1/° C. for the average for this temperature range.

Simax™ glass, Czech borosilicate low expansion, chemical and heat resistant glass (80.4% $SiO_2$, 13.0% $B_2O_3$, 2.4% $Al_2O_3$, 4.2% $Na_2O+K_2O$), basically the same as Pyrex #7740, as judged by chemical composition; 20 to 300° C. average linear expansion coefficient is $33*10^{-7}$ 1/° C.

soda lime, electrical lamp bulbs (Corning #0080*): 73.6% $SiO_2$, 16.0% $Na_2O$, 0.6% $K_2O$, 5.2% CaO, 3.6% MgO, 1.0% $Al_2O_3$; $92*10^{-7}$ 1/° C. (0° C.-300° C.)

borosilicate, low expansion glass (Pyrex #7740*, Corning Glass Works: 80.5% $SiO_2$, 3.8% $Na_2O$, 0.4% $K_2O$, 12.9% $B_2O_3$, 2.2% $Al_2O_3$); $32.5*10^{-7}$ 1/° C. (0° C.-300° C.)

bottle glass (hollowware, container glass), room temperature linear expansion coefficient=$90*10^{-7}$ 1/° C. (9.0 ppm/° C.).

Typical linear expansion coefficient ranges for glasses are $5*10^{-7}$ 1/° C. to $150*10^{-7}$ 1/° C. Commercial silicates (silicate glasses) are in the range $70-100*10^{-7}$ 1/° C. Oxide glasses thermal expansion coefficients can be varied from 0 ($SiO_2$—$TiO_2$, Ultra-Low-Expansion glasses for mirror blanks) to over $200*10^{-7}$ 1/° C. for specialty phosphate sealing glasses. Liquid state coefficient of thermal expansion is 2 to 4 or even 5 times its value for the glass material in solid state.

Two distinct glass compositions or formulations, with materially differing linear expansion coefficients, are needed to make irregularly-shaped fibre, i.e. one glass composition with high linear expansion coefficient and the other one with low linear expansion coefficient.

For the basic borosilicate glass used for glass wool, the oxide of consideration for lowering the linear expansion coefficient is boric oxide $B_2O_3$, and the oxide for increasing the linear expansion coefficient is sodium oxide $Na_2O$.

Potential Candidates:

glass A—low thermal expansion glass: high-borate, low-soda lime-aluminosilicate glass glass B—high thermal expansion glass: high-soda, low-borate lime-aluminosilicate glass.

| glass composition by oxides weight % | | | | | | |
|---|---|---|---|---|---|---|
| $B_2O_3$ | $Na_2O$ | $SiO_2$ | $Al_2O_3$ | CaO | MgO | $K_2O$ |
| glass A 14-24 | 0-10 | 50-61 | 0-7 | 9-13 | 0-5 | 0-2 |
| glass B 0-6 | 14-25 | 52-60 | 0-8 | 6-10 | 0-7 | 0-2 |
| our glass 6.5 | 16.5 | 61.0 | 2.7 | 10.4 | 1.7 | 1.0 |

In each composition there will typically be less than about 1% total of various other constituents such as, for example, $Fe_2O_3$, $TiO_2$ and SrO, not intentionally added to the glass, but resulting from the raw materials used in the batch formulation.

Other preferred glass A and glass B compositions:

| glass composition by oxides weight % | | | | | | |
|---|---|---|---|---|---|---|
| $B_2O_3$ | $Na_2O$ | $SiO_2$ | $Al_2O_3$ | CaO | MgO | $K_2O$ |
| glass A 19-22 | 4-6 | 52-57 | 4-6 | 10-11 | 1-3 | 0-2 |
| glass B 0-6 | 15-21 | 57-65 | 2-6 | 8-9 | 4-6 | 0-2 |
| our glass 6.5 | 16.5 | 61.0 | 2.7 | 10.4 | 1.7 | 1.0 |

The inventor's current single glass composition belongs to the glass B category (glass with high linear expansion coefficient). Other possible glass A and glass B choices are:

| glass composition by oxides weight % | | | | | | |
|---|---|---|---|---|---|---|
| $B_2O_3$ | $Na_2O$ | $SiO_2$ | $Al_2O_3$ | CaO | MgO | $K_2O$ |
| glass A 20.0 | 5.0 | 56.5 | 5.0 | 10.0 | 2.0 | 1.0 |
| glass B 6.5 | 16.5 | 61.0 | 2.7 | 10.4 | 1.7 | 1.0 |

In the aforementioned example, since the boric oxide $B_2O_3$ content for glass A is more than 12%, one can not use the method of English and Turner to calculate the linear expansion coefficient for this glass; the option is to use the method of A. A. Appien (Appien A. A.: Chimija Stekla (Glass Chemistry), Izd. "Chimija", Leningrad, 1970), valid for boric oxide $B_2O_3$ content of up to 30 mole %. It is important to specify the temperature, or the temperature range, when giving linear expansion coefficient, since generally, this coefficient is temperature dependent.

By measuring fibre diameter d (d=0.1 to 0.3 mm) and height (rise) h (h<20 mm), for a 200 mm curved fibre span s, one can calculate the difference in linear expansion coefficients for a given and reference glasses according to formula:

$$\Delta\alpha = 1.4\, hd * 10^{-7}\ 1/° C.\ [h,d]=\text{mm}$$

This formula is given in Technologia Szkla (Glass Technology), $2^{nd}$ ed., Arkady, Warszawa, 1972 (in Polish), page 113.

Background for Glass Tubing

Various processes are available for drawing a continuous length of glass tubing, either hollow or solid, from a source of molten glass. Commercially important processes are the Danner, the Modified Down Draw and the Vello Processes.

a) Danner Process:

The Danner Process (U.S. Pat. No. 1,219,709) was developed for the continuous production of glass tubing and rod. Glass tubing is made by "flowing" a continuous stream of a molten glass onto the surface of a downwardly sloping, rotating, hollow mandrel, through which air is blown while the glass is drawn. The tubing is then drawn over a line of support rollers by a drawing machine situated up to 120 m away. The dimensions of the tubing are determined as the glass cools through its setting point at the catenary or unsupported section between the hollow mandrel (blowpipe) and the first line of rollers.

Rod is produced in a similar manner by eliminating the use of blowing air and solid rather than hollow mandrel tip. The tube shape is maintained by a stream of air blown through the mandrel. For making rods, a slight suction is maintained in order to collapse the walls of the glass envelope as it leaves the mandrel. A mandrel is either refractory or refractory covered (refractory sleeve). Hollow profiles require mandrel to form the shape. A mandrel includes an air channel through which air is blown to maintain hollow form and keep the tube from collapsing, during cooling (hardening). A drawing force is exerted on already hardened (cooled) tubing section, far away from the mandrel.

b) Modified Down Drawn Process:

Molten glass flows through an annular orifice in the bottom of a bowl, and air is blown through the interior of the resulting tubing. Pulling is done by traction from below. The process allows the forming of complex cross sections, including oval bore shapes, such as that of a thermometer. Strips of a second glass can be fused to the primary glass, as in a thermometer, by drawing a stream from an auxiliary melting pot.

c) Vello Process:

The Vello Process (U.S. Pat. No. 2,009,793, Sanchez-Vello, the inventor) was a later development, with a production capacity greater than that of the Danner Process. In the Vello Process, molten glass flows vertically from a forehearth through an annular space surrounding a hollow, vertical and rotating, bell-shape ended refractory mandrel. Tubing is made by blowing air through a bell with a hollow tip, while rod is produced by using a bell with a solid tip; tubing must be rotated as it is being drawn in order to meet dimensional requirements, otherwise it would flatten or collapse. The Vello Process can be regarded as a hybrid of the Down-Draw and the Danner Processes.

Some of US Patents disclosing the method of and/or apparatus for making glass tubing include: U.S. Pat. Nos. 1,219,709; 1,571,216; 1,574,482; 1,750,972; 1,926,410; 1,926,905; 1,933,341; 1,975,737; 2,009,793; 2,765,586; 3,063,268; 4,228,206; 4,717,607; 5,080,705 and 5,213,599.

Hollow Glass Fibre

The basic principles of making hollow glass fibre, be it commercially manufactured hollow continuous glass fibre, or be it the concept of making hollow insulation glass fibre by a rotary process, directly follow the governing logic of the glass tube manufacturing process. To make a hollow glass tube one has to flow molten glass around a central tube, surrounding it completely, and blow air through the tube central channel to maintain molten glass hollow shape (prevent it from collapsing), and exert mechanical drawing force to elongate the molten glass hollow shape.

In the cases of glass tube and hollow continuous glass fibre, drawing is done by strictly mechanical means, i.e. drawing machine or winder, respectively. For hollow insulation glass fibre, made by a rotary process, drawing (attenuation) force is the combination of mechanical pull (spinner rotation) and aero-dynamical drag force (burner+blower gas flow).

Background for Hollow Continuous Glass Fibre

Much consideration has been given to the concept of retaining the strength of the cross-sectional area of the fibres while reducing the weight of the composite in which the fibre is used. Hollow fibres meet this requirement. Filament wound composites insure high strength in a relatively lightweight object. Filament wound applications include the manufacture of rocket motor cases, hydro-space vehicle bodies, large storage tanks, radar domes, and other housings of similar size and nature. Hollow fibres also offer lower dielectric constant as compared to that of solid fibres.

Hollow glass fibres (textile or continuous glass fibres) are used to reinforce plastics (FRP-Fiberglass Reinforced Plastics); hollow glass fibre composites (composite laminates) offer a substantial weight advantage (reduction) for aerospace applications where weight is of primary concern. Some examples are a coarser (stronger) 60 µm diameter, 50% void fraction hollow glass fibre, or a finer, 10 µm fibre with more than 50% hollowness (void fraction). Commercially available Russian hollow glass fibre (Polotsk SteklVolokno) has 10 microns average diameter and void fraction of 45-50%. Non-woven materials and fabrics made from these hollow fibres are used as a reinforcing material in the production of light-weight FRP, which are 20-30% lighter than the solid fibre reinforced plastic materials.

Hollow glass fibres (textile or continuous) are presently made by a kind of a down-drawn process.

Following is a sample of U.S. patents concerned with the manufacturing of hollow glass fibres:

U.S. Pat. No. 2,269,459 (Owens Corning) describes the process for manufacturing a single hollow glass fibre by flame drawing a pre-formed glass tube into a fibre size.

U.S. Pat. No. 3,268,313 (Pittsburgh Plate Glass)—a horizontal bushing is provided with a plurality of tips through which glass flows as streams to be attenuated by winding means which applies a tractive force to the streams, so as to attenuate the streams into filaments. A tube having a tapered terminal end, and connected to a source of pressurized gas, is concentrically located within each tip. Simultaneously with the passage of glass through each tip and around the concentric tube, pressurized gas is continuously discharged through each tube into the interior of the glass stream, so as to produce a hollow stream of glass which is attenuated into a filament of hollow configuration. A plurality of hollow continuous glass fibres of substantial uniformity are made this way. Each air tube extends by a fixed distance of 0.030" to 0.060" beyond the terminus of its respective orifice. This approach has proved to be impractical. Over time, bushing bottoms had a natural tendency to sag, distorting the lumen of the hollow fibre produced, not concentric any more, resulting even in solid fibres.

U.S. Pat. No. 3,421,873; U.S. Pat. No. 3,510,393; U.S. Pat. No. 4,039,718; U.S. Pat. No. 4,698,082 provide void fractions of 10 to 65%. These provide resin reinforcement in filament wound applications. Hollow fibres provide a significant improvement in the strength to weight ratio of reinforcing fibres utilized to reinforce resin fibre composites.

In U.S. Pat. No. 4,704,149(PPG), surrounding the central air (gas) tube in a generally symmetrical pattern are a plurality of circular glass delivery passages exiting from the bushing interior to the exit of the bushing tip. Another other option includes four elliptical shaped glass delivery passages surrounding the central air delivery tube throughout the length of the bushing tip. Bushings and bushing tips are made of 80% platinum Pt—20% rhodium Rh alloy. Gas used to make hollow fibre can be any gas inert to molten glass, for example, nitrogen, carbon dioxide, air and the like.

In U.S. Pat. No. 4,846,864 (Owens Corning) a gas filled void in the glass filament is formed by supplying ambient air through a central, bushing tip inserted tube, connected to the bushing tip side wall, rather than having a centrally located air tube, extending through the pool of molten glass above the bushing.

U.S. Pat. No. 5,776,223 (Owens Corning) basically refers to shaped fibres and hollow fibres, having a void fraction 20% to 80%.

Background of Hollow Insulation Glass Fibre Made by a Rotary Process

U.S. Pat. No. 3,257,183 (Owens Corning)—This patent discloses making flake glass, but the basic approach can, in principle, be extended to make hollow insulation glass fibre by a rotary process. A series of small diameter glass orifices (298) is circumferentially arranged around a central compressed air (or other inert gas) outlet (316) in the spinner peripheral wall. Individual glass streams, after exiting spinner orifices (298), tend to join each other and form a rather thick walled cylindrical or tubular continuous glass film. Expansion of the compressed air or other gas under pressure delivered into the interior of a cylindrical film blows the film up and further attenuates it, to make it much thinner, and finally, after chilling, the thin film is broken up to form flakes of glass.

In the manufacture of hollow filaments of polymeric materials it is common to form a closed hollow shape or cross-section by having a multiplicity of closely located separate slits machined in the spinneret, some examples are given in U.S. Pat. No. 3,528,128; U.S. Pat. No. 3,772,137, U.S. Pat. No. 4,483,903 and U.S. Pat. No. 4,850,847.

A method of making coalesced mineral (glass) fibres by discharging molten glass as primary molten streams from orifices and joining at least one primary stream to an adjacent primary stream to form a coalesced stream of different cross-sectional shape from that of the orifices is disclosed in U.S. Pat. No. 4,620,859 (Owens Corning).

In U.S. Pat. No. 5,622,671 (Owens Corning) a rotary process for producing hollow polymer fibres is disclosed. In principle, it is a rotary process adaptation of the basic concept given in U.S. Pat. No. 4,846,864 (Owens Corning). A spinner peripheral wall is fitted with a multiplicity of tip assemblies where the central, ambient air supplying tube is connected to the tip assembly outside tube. The peripheral wall spinner hole is counterbored. The smaller diameter hole is made to support the tip assembly. The larger diameter hole serves as an annular channel for supplying ambient air to the central tube. An outer tube is provided with a flange on its inside spinner end.

Among the closest art to the present invention is U.S. Pat. No. 5,647,883 (Owens Corning) which discloses an apparatus for making hollow, multi-component, irregular-shape fibre for thermal/acoustical insulation. The spinner creates irregular-shape hollow fibres which exhibit a substantially uniform volume filling nature, and provide improved recovery and thermal resistance abilities, even in the absence of a binder material.

In U.S. Pat. No. 5,647,883 a spinner is provided for making dual-component hollow fibres. The spinner geometry is of vertical baffle (glass compartment) design known from the earlier Owens-Corning patents concerned with making dual-component, irregularly-shaped solid glass fibre. To make fibre hollow, a gas conduit is operatively adapted to provide each spinner peripheral wall fibre forming nozzle with a suitable gas, such as air, nitrogen, argon, combustion products, etc. An internal burner is preferably used to keep the spinner interior hot, as well as to provide combustion products to serve as a gaseous medium for forming hollow glass fibres. Gaseous combustion products are ingested into the molten A and B glass components flowing out of the orifice configuration to form a hollow bore in the emerging dual-glass primary fibre.

In U.S. Pat. No. 5,647,883, gas conduits 94, in form of tubes, are welded or brazed to the spinner body. In one embodiment, each gas conduit comprises a tube disposed through one of the baffles and out the orifice, preferably extending beyond the peripheral wall. Tube 94 dimensions: an overall length=0.75" to 1.50" (1.9 cm to 3.81 cm), outside diameter=0.016" to 0.100" (0.406 mm to 2.54 mm), wall thickness=0.004" to 0.020" (0.102 mm to 0.508 mm).

When the A and B glass components exit their respective orifices they join each other in a side-by-side relation and approx. 1:1 mass ratio. Other ratios are also possible by proper orifice sizing. Orifice drilling techniques include: laser drilling, electrical discharge milling (EDM) and electron beam drilling.

Some examples of orifice geometry were disclosed as follows in the '883 patent:

|  | case 1 | case 2 | case 3 |
|---|---|---|---|
| tube 94 outside dia. | 0.016" | 0.040" | 0.100" |
| orifice 90 dia. | 0.029" to 0.047" | 0.048" to 0.063" | 0.104" to 0.113" |
| passages 92 and 93 dia. | 0.023" to 0.059" | 0.044" to 0.075" | 0.102" to 0.121" |

In FIG. 7 of U.S. Pat. No. 5,647,883, exemplary nozzles (orifice geometries) with the Y-shaped form of passages 92 and 93, and tubes 94 were successfully tested (Col. 10, Ln. 14).

The passages 92 and 93 had the same length of about 0.124" (3.15 mm) and diameter of about 0.030" (0.76 mm) and were pitched at an angle of about 35 deg from normal to the spinner peripheral wall. Orifice 90 diameter was either 0.055" (1.40 mm) or 0.058" (1.47 mm). Tube 94 had an overall length of about 2.0" (50.8 mm), an outside diameter of about 0.040" (1.02 mm), and wall thickness of about 0.010" (0.254 mm). The leading end 95 of each tube 94 extended beyond wall 64 a distance of about 0.020" (0.508 mm).

FIGS. 8 and 8A of U.S. Pat. No. 5,647,883 show a slotted embodiment of the orifices in the spinner; recommended slotted orifice dimensions: length=0.10" to 0.13" (0.254 cm to 0.330 cm), width=0.006" to 0.15" (0.152 mm to 0.381 mm).

The inner burners 71, shown in FIG. 3 of U.S. Pat. No. 5,647,883, use natural gas (methane) as a fuel. A bottom center casing plate 97 with inner burners 71 is used to sufficiently seal the spinner 60 so that the combustion gases build-up a back pressure $P_1$ in the interior of spinner 60 as they exit from the burners 71. Combustion products exit the gas conduits at a pressure $P_2$, high enough to form a bore in the dual-glass primary fibre.

Dual-component hollow fibre insulation product can comprise hollow fibres with a wide spectrum of glass A and glass B percentages, probably even including a small fraction of single-composition glass fibres. The actual fractional content of a given glass component can be determined by examining fibre cross-section by scanning electron microscopy (SEM), or any other suitable technique. The average hollow fibre diameter made by the '883 spinner is 4 to 6 microns (Col. 8, Ln. 61), 5 microns (Col. 12, Ln. 5).

The expected influence of hollow fibre void fraction on light density fibrous insulation product thermal conductivity is as follows (U.S. Pat. No. 5,647,883: Col. 13, Ln. 53 ... 64):

| product density = 0.5 pcf; fibre outside diameter = 5 microns; | | | | | |
|---|---|---|---|---|---|
| fibre void fraction [%] = | 30 | 40 | 50 | 80 | 90 |
| product k value [(Btu in)/(hr ft² deg F.)] | 0.287 | 0.281 | 0.273 | 0.248 | 0.233 |

These numbers have likely been generated by some mathematical model for evaluating the thermal resistance of glass wool insulation products.

In U.S. Pat. No. 5,674,307 (Owens Corning) hollow mineral fibres are made using a modified rotary process, an approach very similar to that disclosed in U.S. Pat. No. 5,622,671 (Owens Corning) for manufacturing hollow polymer fibres. Mineral fibres mean fibres of glass, rock, slag or basalt; single glass composition, fibres are hollow, but straight.

The hollow glass fibres are reduced in weight between 10% and 80%, preferably between 25% and 50%, compared to solid glass fibres; the same insulating capability product can be made at lower density.

Preferred glass composition, oxide weight percent:

| $B_2O_3$ | $Na_2O$ | $SiO_2$ | $Al_2O_3$ | CaO | MgO | $K_2O$ |
|---|---|---|---|---|---|---|
| 14-24 | 0-10 | 50-61 | 0-7 | 9-13 | 0-5 | 0-2 |

Generally, the temperature of the molten glass within the spinner is from slightly above 800 deg C. to slightly above 1300 deg C., and typically is about 1038 deg C.

Interestingly enough, no main or annular burner is used in the '307 patent (see FIG. 1). Instead an induction heater or an electric resistance heater 132 is considered as an optional heating means. Tip assemblies for making hollow fibres are secured to peripheral wall orifices by welding or brazing. Some experimentation with 15" diameter spinner fitted with just 4 (four) tip assemblies, and no external heating from an induction heater, and no secondary attenuation from an annular blower, resulted in 100 microns average outside diameter hollow fibre, with the average void fraction of 60%; more than 90% of produced fibres were hollow.

The inside diameter $D_t$ of the tapering portion 32 at the distal end 52 is preferably from about 0.040 inch (0.102 cm) to about 0.140 inch (0.356 cm)"—Col. 6, Ln. 10 . . . 12, so we can write $D_1=D_t=0.040"$ . . . $0.150"$; let's take the middle value of $D_1=0.095"$ for further considerations. Diameter $D_1$ measured in FIG. 2 of U.S. Pat. No. 5,674,307 is 26 mm, and the orifice diameter $D_2$ measured on the same drawing is 45 mm, so the ratio $D_2/D_1=45/26=1.73$; the proportions shown in FIG. 2 seem to be right; for $D_1=0.095"$, the orifice diameter $D_2$ is therefore $1.73*0.095=0.164"$. For a circumferential orifice spacing (pitch) of $2D_2=2*0.164=0.328"$, one can have 143 tip assembly fitted orifices per row of holes, for a 15" diameter spinner.

The preferred number of tip assemblies, for a 15" diameter hollow fiber, single-glass spinner of design given in U.S. Pat. No. 5,674,307, would be 1,000 to 3,000 (Col 8, Ln. 12, . . . ).

The hollow fibre, single-glass spinner design disclosed in U.S. Pat. No. 5,674,307 seems to be expensive and difficult in manufacturing.

U.S. Pat. No. 5,743,932 (Owens Corning) discloses hollow and irregular shape, multi-component insulation fibreglass, rotary process, similar to U.S. Pat. No. 5,647,883.

U.S. Pat. No. 5,770,309 (Owens Corning)—spinner for making hollow, irregular-shape, bi-component glass fibre; two glass formulations differ in thermal expansion coefficients; irregular-shape hollow fibres exhibit a substantially uniform volume filling nature, and provide improved thickness recovery and higher thermal resistance, binder content can be reduced substantially. This is similar to U.S. Pat. No. 5,647,883 and U.S. Pat. No. 5,743,932.

Inventor's Prior Art Glass Fiber

The k-value versus density best fit (regression) curve for the present inventor's glass fibre gives the k-value of 0.328 (Btu in)/(hr ft$^2$ deg F.) for 0.5 pcf density solid glass fibre insulation materials; coarser than 5 microns fibres included, 5 to 6 microns. The inventor makes some 0.5 pcf rolled products, so a bit coarser fibre, and 0.330 k-value. At 5 micron diameter, 0.5 pcf solid fibre glass insulation material with k value of 0.310, and the equivalent 40% void fraction fibre glass wool product has its k value of 0.280, then the increase in material thermal resistance against the flow of heat almost reaches the 11% mark, as calculated below:

$R=t/k$; R is product R value (thermal resistivity), t is product thickness, and k is product thermal conductivity, all expressed in British Units;

$((R_2-R_1)/R_1)*100\%=((k_1-k_2)/k_2)*100\%=((0.310-0.280)/0.280)*100\%=10.7\%$.

The ability of compressed insulation product to recover its thickness after unpacking depends upon both the uncompressed and compressed product densities; wool insulating materials are generally classified into three broad categories, based on their density ranges:

light density wool insulation materials . . . 0.15 to 0.60 pcf (2.4 to 9.6 kg/m$^3$)

medium density wool insulation materials . . . 0.60 to 0.90 pcf (9.6 to 14.4 kg/m$^3$)

heavy density wool insulation materials . . . 0.90+pcf (more than 14.4 kg/m$^3$)

If fibrous insulating product is compressed too much, a substantial portion of glass fibres may break, and product loses its resiliency and ability to recover the required product thickness after unpacking. Less than required product thickness results in compromising product insulating ability. For prior art light density insulation products of straight solid fibres, the maximum practical compressed density is from about 3 to 6 pcf (48 to 96 kg/m$^3$), depending on the product nominal (uncompressed density). A standard (straight and solid glass fibre) light density insulation product, compressed to a density of 6 pcf (96 kg/m$^3$), recovers to 0.5 pcf (8 kg/m$^3$) after unpacking, and therefore its compression ratio is 12:1. For straight fibre made light density wool insulation the allowable compression ratio is not more than 15:1. For curly fibre based light density insulation products (wool batts), the compression ratio can be increased by a factor of three (3), up to a 50:1 ratio. For standard R19 insulation product, it is believed that compressed density can be increased from 4 pcf (64 kg/m$^3$) to 12 pcf (192 kg/m$^3$) by employing irregularly-shaped dual-glass fibres. This translates to potential savings in shipping, storage, and handling costs, also less packaging materials needed.

The inventor's current spinner has 22 to 26 rows of holes, depending on drilled hole pattern. Some other manufacturers use spinners with up to 40 rows of holes.

If one considers the smallest recommended holes, i.e., $D_1=0.040"$, then the maximum number of holes drilled for 15" diameter Owens-Corning spinner can be found as follows:

$D_2=1.73*0.040=0.069"$; number of holes per row, for a $2D_2=2*0.69=0.138"$ circumferential spacing, is 341 holes per row; for a 1.5" high drilled hole band, and $2D_2=0.138"$ vertical row to row spacing, the number of rows of holes is $10+1=11$; 11 rows of holes, 341 holes per row, results in 3,751 holes spinner.

In summary, replacing solid fibres with hollow ones certainly creates some profit opportunities for the glass wool manufacturer. The issue is how to make this hollow glass fibre with high enough throughput capacity.

OBJECT OF THE INVENTION

This invention seeks to provide an improved wool insulating material with a more uniform volume filling nature, natural ability to form binderless cohesive bonds and maximized fibre surface area such that the wool insulating product has reduced thermal conductivity and improved thickness recovery, and can be employed with substantially reduced amount of binder material. The invention seeks to provide a more favourable hollow fibre dual-glass spinner design, both in terms of its throughput capacity, as well as, its manufacturing cost.

It is reasonable to assume the maximum number of holes for this 15" hollow fibre spinner to be around 3,000. As compared to solid fibre 15" diameter spinner this number of holes seems to be rather small, number of holes for solid fibre 15" spinner can even exceed 20,000, but in fact, having 15" hollow fibre spinner with 3,000 holes is a quantum leap forward.

The inventor's hollow fibre, dual-glass spinner design is believed to be much simpler in design and manufacturing, and more cost effective. Similar number of holes can be accommodated in spinner peripheral wall as for Owens-Corning hollow fibre spinner. The inventor's hollow fibre dual glass spinner can also be run with single glass composition, no major modifications required.

Row to row spacing is 0.050" (more or less), so the drilled band height is slightly above 1 inch. It is well known from industrial practice that one can not really extend the drilled band height beyond a certain limit for a given fiberizer configuration simply because the very bottom part of spinner becomes too cold for fiberizing, and eventually the bottom rows of holes get plugged with the devitrified glass. Present drilled band height limit is slightly above 1 inch. Owens-Corning spinner is more or less 1.5 inch; for a $1.5D_2$ row to row vertical spacing (dense hole pattern) and $D_2=0.164$" there are $1.5/(1.5*0.164)+1=7$ rows of holes, and $7*143=1001$ tip assembly fitted holes.

SUMMARY OF INVENTION

These objects are met by providing an improved spinner design for manufacturing irregularly shaped hollow fibres, made from suitable thermoplastic insulation materials, such as glass. Fibrous insulation product comprising hollow fibres requires less insulation material (glass) than the equal diameter solid glass fibre to provide the same fibre/still air overall contact area. The same resistance against the flow of heat can be obtained at lower product densities. Employing an irregularly shaped form of fibre, rather than the straight one, helps to build a more uniform, lattice structure with a better volume filling capability. This will directly translate to better thermal performance and higher allowed compression ratios. The greater natural entanglement of irregularly-shaped fibres helps to create a wool pack with such inherent integrity that only limited amount of binder agent has to be added to bring the wool pack strength and integrity to the level needed for home (residential) insulation products. The irregular shape of these fibres makes the insulation product feeling less dusty and itchy.

Two distinct molten glass compositions A and B are supplied from two glass furnaces (electric melters), through their respective forehearths, to rotary fiberizers, underneath the forehearths. Glasses A and B have different physical attributes, so upon cooling, dual-component fibres made from them, will have some natural tendency to assume an irregular, rather than a straight shaped geometry or configuration. Differing physical attributes of glasses can encompass differing coefficients of thermal expansion, differing viscosities, differing melting points, or differing mechanical strengths. Veils of hollow dual-glass irregularly-shaped fibres are collected on foraminous, vacuum equipped, conveyors. Then as a wool pack, are subject to a thermal treatment in a convective type, tunnel oven of a top-bottom configuration, dual perforated flight, conveyor design. Other methods of providing wool pack structural integrity include stitching, needling, or hydro-entanglement.

The inventor's choice for making irregularly-shaped hollow fibres is to use two distinct glass compositions, with different coefficients of thermal expansion. The difference in the coefficient of thermal expansion between the two glass compositions is preferably greater than about 2 app./° C., and more preferably more than 5 app./° C.

Preferably glasses A and B are joined in equal amounts to form a given hollow fibre, but the glass A content in the hollow fibre can generally be in the range of from 20% to 80%. The term "glass" is meant to include any glassy forms of materials such as rock, slag, and basalt, as well as traditional glasses.

Therefore this invention seeks to provide a fiberizing spinner, comprised of at least one integral member, adapted to produce at least hollow irregularly shaped insulating fibers from two glasses of differing coefficients of thermal expansion; said spinner being in the form of a circular pot, including an open top, and annular horizontal top flange, a vertically disposed peripheral side wall, and a circular, horizontal bottom wall; said spinner further comprising a plurality of vertically disposed, equally circumferentially spaced radial vanes extending inwardly from said spinner peripheral side wall; said vanes creating a plurality of separate, vertically disposed molten glass compartments adjacent to the peripheral side wall of said spinner; said spinner further including a plurality of horizontally-disposed annular rings with hollow channels therethrough and extending radially, inwardly, from said spinner peripheral side wall; wherein an uppermost annular ring further includes a top flange, extending further inwardly towards the spinner central axis than the remaining annular rings; said spinner also comprising a plurality of fiberizing center air orifices located on the outer wall of said peripheral side wall, and being an open communication to a horizontal channel through said side wall, connecting to a hollow channel of said annular rings; said spinner further comprising within each vertical compartment, between each pair of vanes, a vertically disposed distribution passage for first glass A and a second vertically disposed distribution passage for a second glass B; said spinner also comprising a plurality of horizontally, vertically stacked alternative, first glass A and second glass B compartments; said spinner also comprising at least two molten glass passages, which exit from each of said first glass A and second glass B compartments; said passages being within said spinner peripheral wall and communicating with open slots glass adjacent at least one of said fiberizing air orifices; wherein in operation, a molten stream of glass A descends downwardly on said circular, horizontal bottom wall of said spinner, and by said centrifugal force through rotation of said spinner, moved outwardly to said outwardly disposed distribution passages for glass A and moving upwardly is forced into said alternative horizontal compartments for glass A; and wherein a molten stream of glass B descends downwardly on said top flange of said annular rings and is, by centrifugal force, moved outwardly to said second vertically disposed passage and moving downwardly is forced into said alternative compartments for glass B; wherein upon interior and exterior heating of said spinner and high speed rotation of same, combustion gases move by said vanes are forced at high speeds through said hollow channels of said annular rings to said fiberizing air orifices, and glass A and glass B are forced through said molten glass passages to slots adjacent said orifices; and dual glasses A and B component hollow fibers are produced.

This invention also seeks to provide a fiberizing spinner comprising two integral members; wherein an inner second integral member provides a horizontal upper shelf or flange to accept molten glass B; and said vanes are formed on a peripheral outer wall of said integral member; the first integral member being an outer member in the form of a circular pot, including an open top, an annular top flange, and a vertically disposed peripheral side wall with a circular, solid, horizontal bottom wall; said outer member further comprising a plurality of horizontal annular rings, being vertically disposed and extending radially inwards towards said spinner's central axis; said rings being hollow and adapted in operation to transport hot pressurizing gasses therethrough and which emerge through fiberizing orifices through said peripheral side wall; said annular rings also adapted to separate a vertically stacked plurality of alternatively placed, horizontally disposed glass A and B compartments; said spinner further comprising a second inner member adapted to be inserted into said first outer member and prior to operation rotated to a position of securement in said outer member through bolts and nuts or other means; said inner member comprise a plurality of vertically disposed radial vanes acting as a fan distribution of pressurized hot gases to said hollow annular rings in operation; and said second member also supplying molten glass A and glass B to said glass A and glass B compartments located in said first outer member; said inner member being circular and of lesser height than said first member and adapted to fit within first member; said second member including a top horizontal annular flange substantially of equal height of said first member; said inner member also comprising a vertically disposed outer peripheral wall; integrally connected to and horizontally disposed within said peripheral wall are a plurality of hollow, alternatively disposed glass A and glass B distributing slots; said slots being adapted in operation to deliver molten glass A and B to glass A and B compartments respectively; also horizontally connected to said inner member peripheral wall is an upper, annular, circumferential intermediate horizontal flange, similar to that described and claimed in claim 1, adapted to accept molten glass B thereon; descending from said intermediate flange is an inner side wall, including an annular bottom flange; said inner member further including, at the base of said vertically disposed outer wall, an inner member horizontal flange adapted to lie on said spinner outer member bottom; wherein in operation said plurality of vertically disposed, radial, equally circumferentially-spaced vanes, adapted in operation to move hot combustion gases by centrifugal force through hollow portions of said annular rings and outwardly; said inner member also comprising pairs of alternately disposed vertical channels, adapted to accept upward moving molten glass A or downwardly molten glass B alternatively, and deposit said glass in respective glass A and glass B distributing slots, and thereafter glass A and glass B compartments respectively.

The hollow nature of the fibres may be quantified by their void fraction, which in terms of the inside diameter $d_i$ and the outside diameter $d_o$ is expressed as $(d_i/d_o)^2$. It is believed that benefits could be realized with almost any degree of void fraction, but in general, the greater the void fraction the greater the benefits obtained. 50% to 80% void fraction is the preferred hollowness range.

Spinner Assembly—Design A

Two glasses A and B, with sufficiently differing thermal expansion coefficients, are provided by a separate glass melter, forehearth and bushing systems (not shown here).

Individual streams of molten glass A and molten glass B are dropped from their respective bushings into a single spinner assembly, at two, radially displaced, locations. If it comes to the practical feed system design, it is likely that certain angular shifts of glass A and glass B bushings will be the preferred ones.

BRIEF DESCRIPTION OF THE DRAWINGS

Embodiments of the invention are shown in the following drawings wherein:

FIG. 9 is a cross section of spinner assembly 21, similar to FIG. 8, showing inner member 21b inserted into spinner 21a;

DETAILED DESCRIPTION OF THE DRAWINGS

Figure 1:
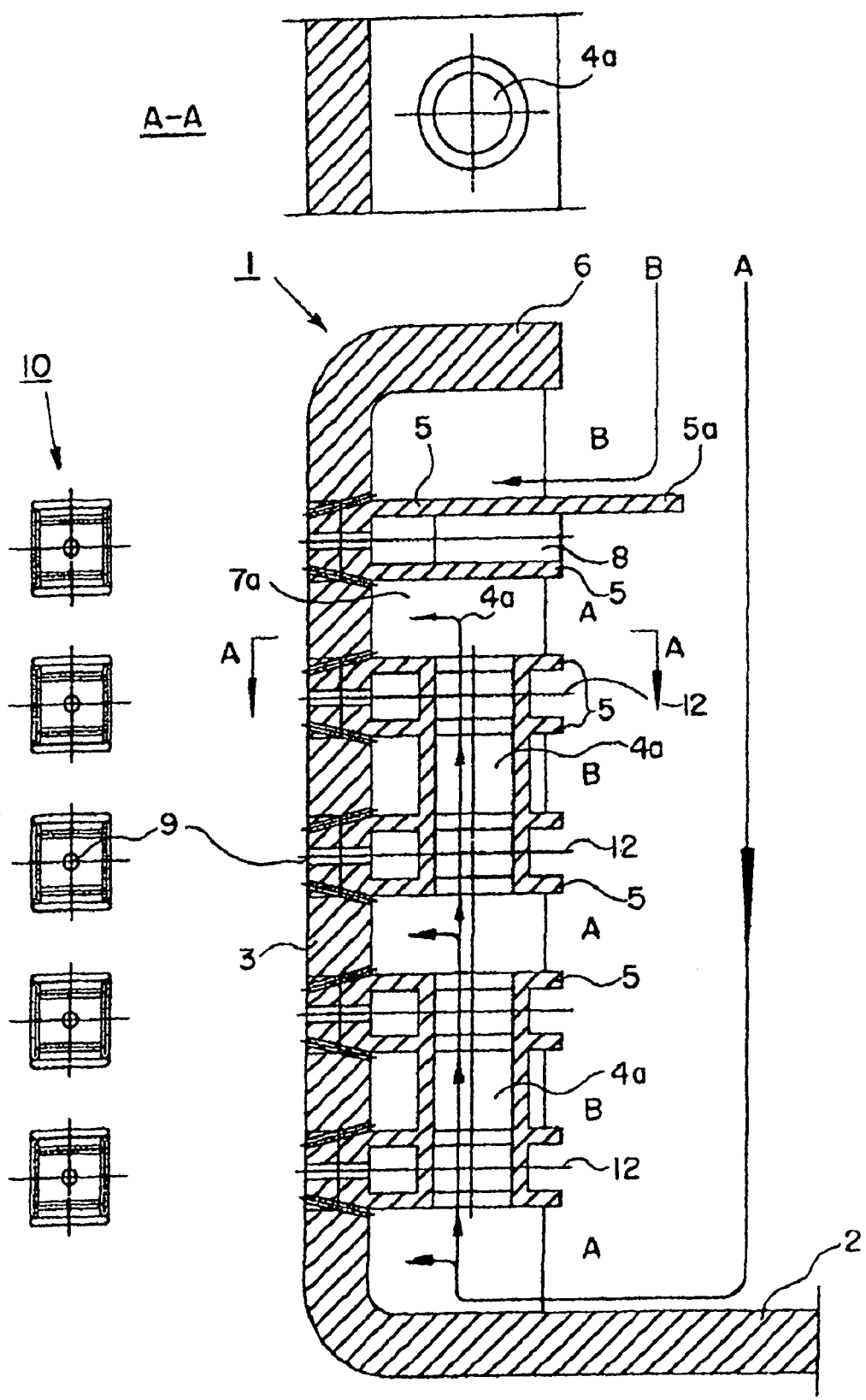
FIG. 1 is a partial cross section (vertical) of spinner assembly 1, in the radial plane through one set of distributing pipe members or distributing passages (upcomers) for glass A.

Referring to FIG. 1, there is a partial vertical section (cross-section) of the spinner assembly 1 in the radial plane through one set of distributing pipe members or distributing passages (upcomers) for glass A. Stream of molten glass A enters the spinner assembly 1 closer to the spinner centre line than the stream of molten glass B, and lands on the spinner bottom 2. By centrifugal action, glass A is forced to flow towards the spinner peripheral wall 3, where it builds a layer (head) of glass A, and flows upwards through a system of distributing passages 4a (upcomers) for glass A. Glass A distributing passages 4a, are shown in FIG. 1 as a circular cross-section pipe members, see the Section A-A. What is not directly seen, is shown in the drawing, FIG. 2a, as dotted lines.

Spinner peripheral wall 3 is on its inner side integral with a multiplicity of properly spaced, and as thin as practical, annular or circular rings 5. These annular rings 5 serve as physical barriers to separate all the process components, i.e. glass A, glass B and gas, and keep them into their own compartments or designated spaces. There is always an air compartment 12 in between the glass A and glass B compartments. Horizontal arrangement of compartments, i.e., horizontal layering, seems to have more potential in fitting the large number of fiberizing centers into a given size spinner than the vertical layering, advocated by prior art. Horizontal, circular or annular rings 5 work as effective spinner structure stiffeners (stiffening ribs), adding some extra rigidity to spinner casting. Unfortunately, these rings extend spinner heat-up time, add to spinner weight, increase spinner cost and make spinner manufacturing (casting, preferably) more demanding.

As shown in FIG. 1, a stream of molten glass B enters the spinner assembly 1 further away from the spinner centre line than the stream of molten glass A, and lands on the radially inwardly extended uppermost horizontal annular ring 5a. Due to a high rotational speed of the spinner assembly, 2,500 rpm, molten glass B moves towards the spinner peripheral wall 3, and builds up a layer of molten glass B upon the inside of this wall. Top flange 6 of spinner 1 serves to bound the head (layer) of glass B from the top.

Figure 2:
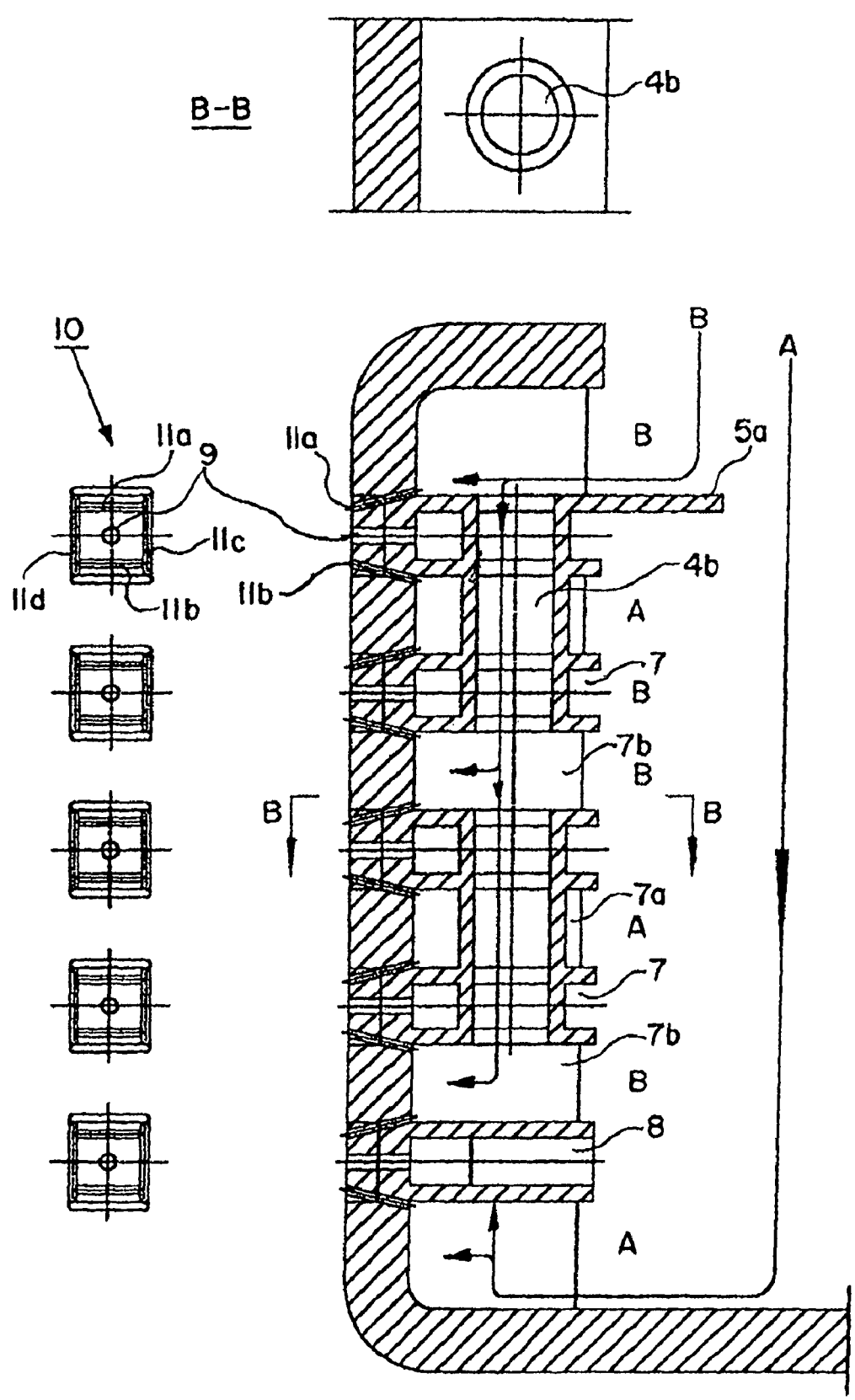
FIG. 2 is a partial cross section (vertical) of spinner assembly 1, in the radial plane through one set of distributing pipe members (downcomers) for glass B.

As shown is FIG. 2, glass B flows down the spinner assembly through a system of distributing passages 4b (downcomers). The distributing passages 4b for the glass B are essentially the same as the distributing passages 4a for the glass A. FIG. 2 shows the mechanism of downward vertical distribution of glass B, the governing principle is exactly the same as for the upward vertical distribution of glass A, shown in FIG. 1. A FIG. 2 provides a line showing movement of glass B downwards. The distributing passages 4a for glass A and the distributing passages 4b for glass B are in radial planes shifted circumferentially, i.e. passages 4b are shown in FIG. 2 and passages 4a are shown in FIG. 1.

Figure 2A:
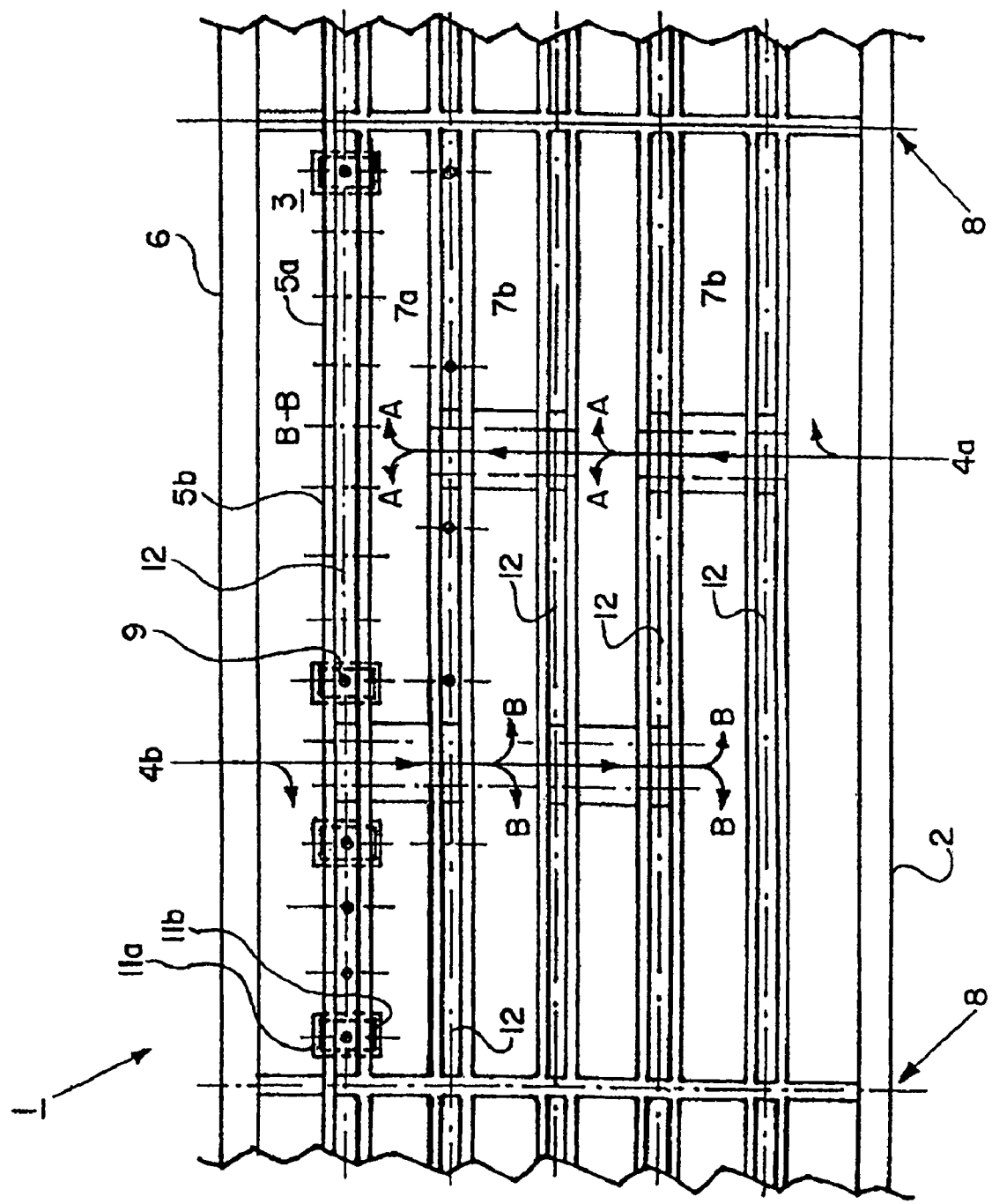
FIG. 2A is a flattened view of a spinner segment viewed from the axis of the spinner.

FIG. 2A is a flattened view of the inner side of the spinner assembly 1 of the present invention viewed from the axis to the spinner 1. This inside view is restricted to one segment of the circumference of the spinner which is composed of a total of 8 segments in the example shown. Each segment is boarded by two vertical separator walls 8, i.e. vanes, spinner bottom 2, spinner top rim 6 and spinner vertical wall 3.

Glass A drips down to land on spinner bottom 2 and is forced outwardly by centrifugal force. The molten glass A is then forced upwardly through upcoming round tube 4a and is directed to alternate, horizontal storage areas 7a.

Lastly, glass B flows downwardly, after having landed on upper extended annular flange 5a, down tube 4b and to fill each alternate horizontal compartment 7b.

Figure 2B:
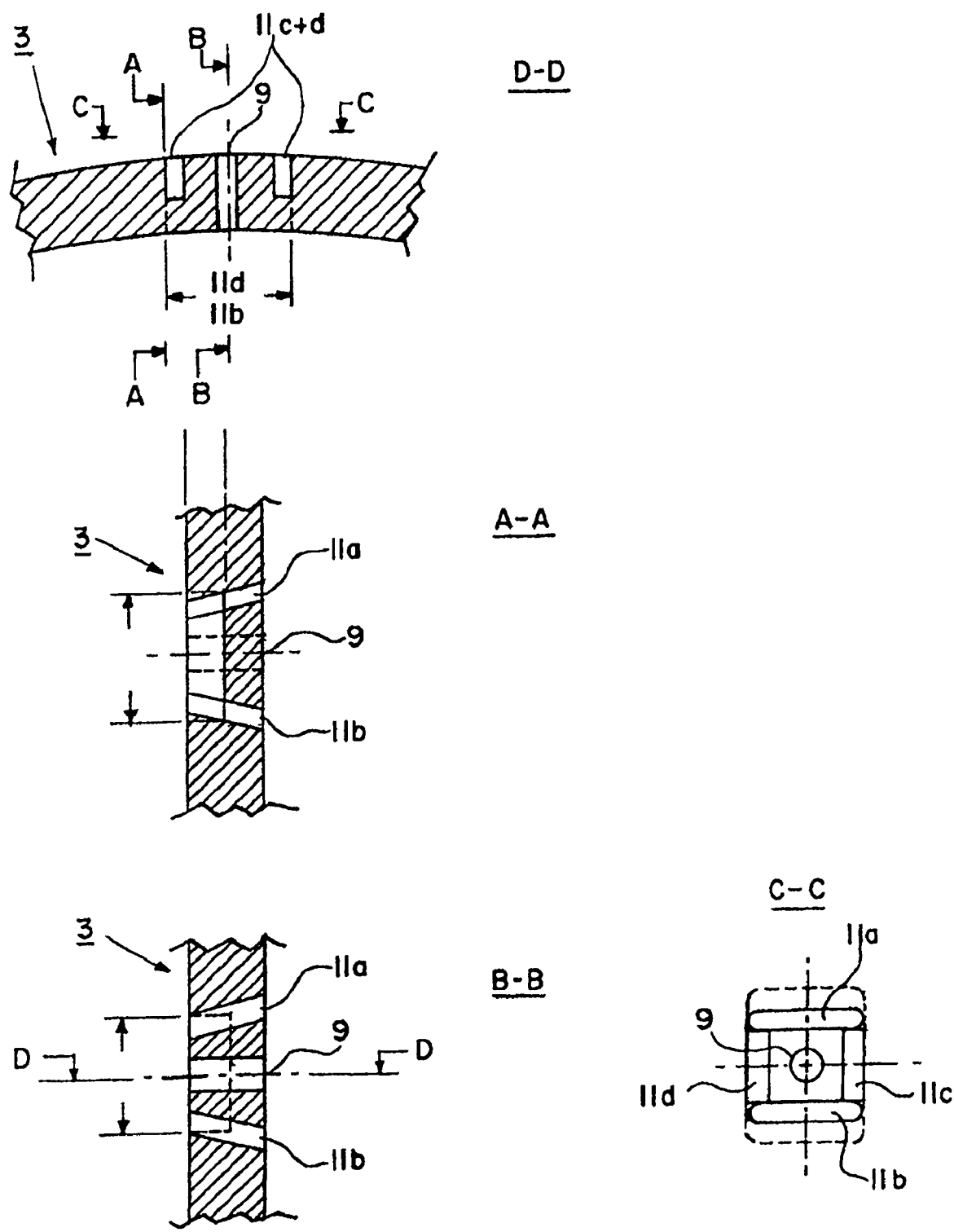
FIG. 2B shows various sections through the spinner peripheral wall

FIG. 2b shows a number of views of cross sections through spinner peripheral side wall 3, wherein T is the wall thickness, O is the orifice 9, upper horizontal slot is 11a, lower horizontal slot is 11b and vertical slots are 11c and 11.

Figure 3:
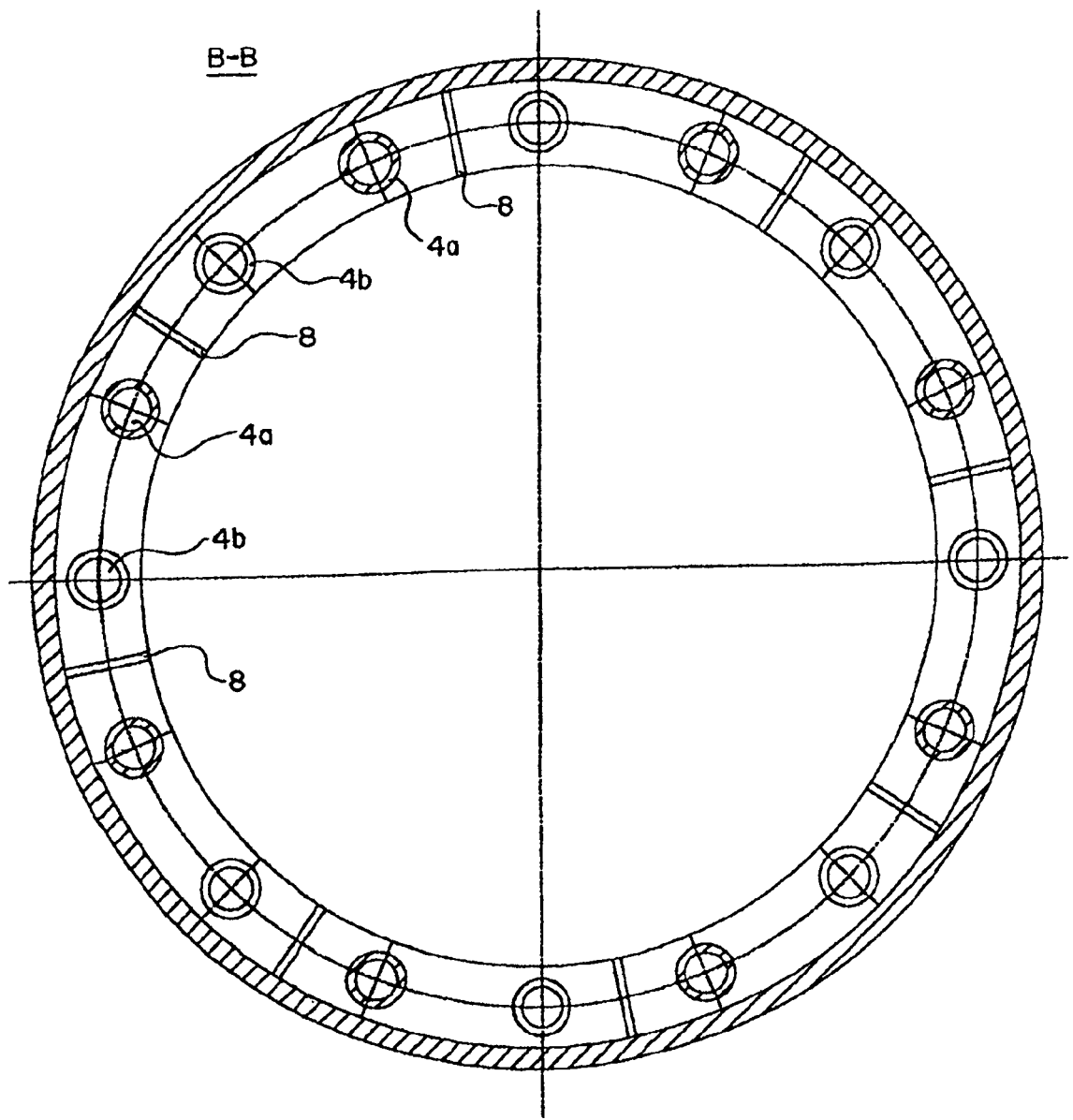
FIG. 3 is section B-B of FIG. 2.

FIG. 3 is a B-B Section of FIG. 2. The circumferential direction shift of passages 4a (glass A) and 4b (glass B) is clearly illustrated. Eight (8) sets of distributing passages 4a and 4b are actually shown. Passages 4a are shifted by 45 degrees with respect to each other. The same applies to passages 4b. The angular displacement between the passages 4a and 4b is 22.5 degrees. Passages 4a for glass A are actually cut through by the B-B Section, so they are shown as cross-hatched. Passages 4b for glass B are not cut through by the B-B Section, and their inner circular edge is clearly visible. It is not the case with their outside edge, which is hidden, and therefore shown as a hidden line (or dotted black line in the black-and-white drawing).

As shown in both FIGS. 1 and 2, there is air, or, more generally, gas compartments 7, in between the glass A compartments 7a and glass B compartments 7b. All these compartments are of horizontal configuration, and are defined by their respective top and bottom annular (circular) rings 5; air compartments are provided with a set of vanes 8; such a vane 8 is shown in FIG. 1 for the very top air compartment, and in FIG. 2, for the very bottom air compartment. Vanes 8 can be better seen in FIG. 3, which is the B-B Section of FIG. 2. A uniform circular arrangement of eight vanes 8 is what is shown, just for the illustration purposes. Vanes 8 are shown to be strictly of radial geometry.

As already mentioned, a spinner assembly 1 rotates at a fairly high rotational speed, 2,500 rpm, more or less. Gas compartment 7, with a set of vanes 8 inside it, acts like an impeller of a fan or blower, drawing air (gas) in from the spinner central cavity, and further forcing it to flow through the multiplicity of air orifices 9 in the spinner peripheral wall 3.

Centrifugally generated pressure difference over the vane 8 radial length can be calculated from the well known Euler Equation of Turbomachinery, to be found in most of Fluid Mechanics textbooks. For the special case of the radial vane impeller, with no stationary guiding vanes on the suction side, the impeller generated pressure difference (increase) is given by the formula: $\Delta P_1 = \omega^3 \rho r_2^2$, where $\omega$ is spinner angular velocity, $\rho$ is gas density, and $r_2$ stands for the trailing edge radius of the impeller vane.

Air orifices 9 are drilled in the spinner peripheral wall 3, perpendicularly to spinner axis of rotation, i.e., in a plane perpendicular to the spinner centre line, and preferably in the radial direction. For radially drilled air orifices 9, the orifice length l is equal to the spinner peripheral wall thickness $t = (R_2 - R_1)$, where $R_2$ and $R_1$ stand respectively for the outside surface and inside surface radius of the spinner peripheral wall. Centrifugally generated pressure increase in the air orifice itself can be calculated from the expression: $\Delta P_2 = \omega^2 \rho l R_m$, where $l = (R_2 - R_1)$ and the mean spinner radius being $R_m = (R_1 R_2)/2$.

Gas pressure $P_2$ inside the spinner does not necessarily have to be equal to the ambient pressure $P_1$ outside the spinner. Spinner inside space or cavity can be largely sealed-off and pressurized by means of stationary inner burners.

The total pressure difference, $\Delta P$, which is the driving force for flow of gas through the air orifices 9 is the sum of all three pressure components: $\Delta P = \Delta P_1 + \Delta P_2 + \Delta P_3$.

Air orifices 9 are of small diameter, up to 1 mm diameter, so the flow of air (gas) through them is likely to be laminar. The laminar flow volumetric flow rate of gas through a straight, constant cross-section, circular conduit can be calculated from the general Hagen-Poiseuille equation:

$$V_{dot} = ((\Pi d^4)/(128 \mu \, l)) \Delta P$$
$$= ((\Pi d^4)/(128 \mu \, l))((P_1 - P_2) + \omega^2 \rho (r_2^2 + l R_m))$$
$$= ((\Pi d^4)/(128 \mu))(((P_1 - P_2)/l) + \omega^2 \rho ((r_2^2/l) + R_m))$$
$$\Delta P = ((P_1 - P_2) + \omega^2 \rho (r_2^2 + l R_m))$$

where:
$V_{dot}$—the gas volumetric flow rate,
$\mu$—the gas viscosity,
l—the gas orifice overall length,
d—the gas orifice diameter,
$P_1$—the gas pressure at the gas compartment vane inlet,
$P_2$—the gas pressure at the gas orifice exit (taken as atmospheric pressure),
$\omega$—the spinner angular velocity,
$\rho$—the gas density,
$r_2$—the trailing edge radius of the gas compartment vane,
$R_m$—the spinner peripheral wall mean radius.

Due to the nature of a dual glass spinner, this invention uses conically shaped glass delivery passages surrounding the gas orifice, which exit in the spinner peripheral wall. Gaseous products of combustion, coming from the stationary inner burners, are used for preventing the freshly formed, still hot and fairly fluid molten glass primary fibre hollow shape, from collapsing.

As the molten glass cools down, the ever increasing viscous forces quickly become strong enough to resist the surface tension forces, responsible for the hollow shape collapse (surface tension always tends to minimize the given liquid mass total surface area). A freshly formed hollow glass fibre, with no pressurized central core, would simply collapse to become a solid primary glass fibre. Molten glass at high temperature does not posses high enough viscosity to sufficiently resist the surface tension driven liquid mass shape changes.

Figures 4A, 4B:
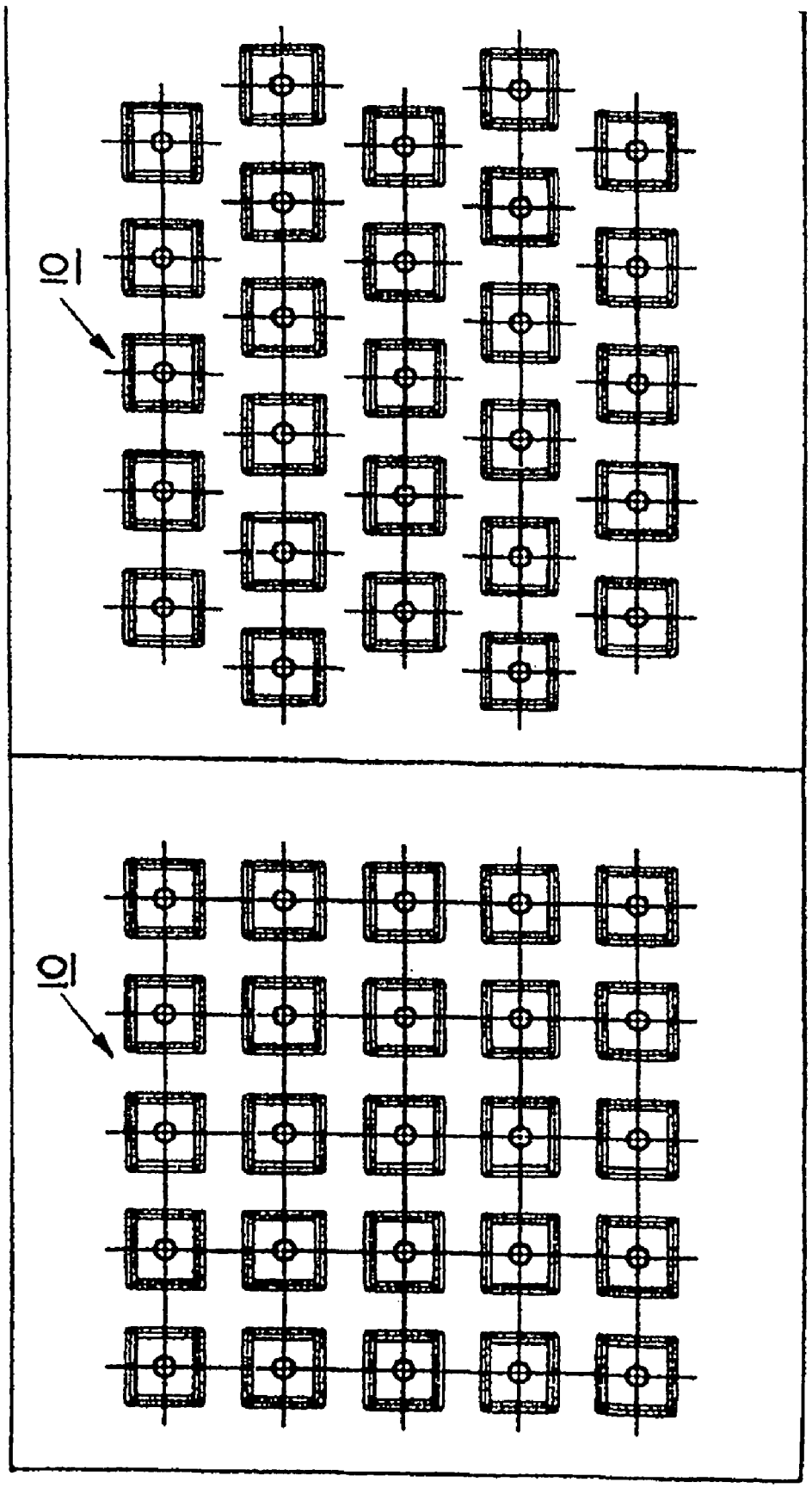
FIG. 4 illustrates on the left and rights sides vertically aligned and staggered assemblies of molten glass slots with associated central gas orifice.

A single fiberizing centre 10, shown in FIGS. 4a and 4b, comprises as shown in FIG. 2 a central air orifice 9, enclosed by the top molten glass slot 11a, bottom molten glass slot 11b, and two side slots 11e and 11d. The configuration of fiberizing center 10, shown in FIGS. 1 and 2, is just to explain the operational principle of making a hollow and curly, bi-component glass fibre. In FIG. 2 it is important to realize that there is no connection between the letters 11a, 11b, 11e, 11d and glasses A and B. Glass A may exit anyone or more of 11a, 11b, 11e, or 11d. In FIG. 2, molten glass B in the top compartment exits through a rectangular shape top slot 11a, laser drilled through the spinner peripheral wall 3; slot 11a is drilled under an angle, so glass B can be delivered close enough to the gas orifice 9 exit. Molten glass A flows from the second to the top compartment, through the bottom rectangular slot 11b. Slots 11a and 11b deliver glasses A and B to horizontal slot exits. To allow glasses A and B to more uniformly spread around the central gas orifice 9, two vertical blind side slots 11e and 11d are drilled on both sides of the central gas orifice. As shown in FIG. 2B, side slots 11e and 11d are only drilled half the way through the spinner peripheral wall.

It is likely that the slot geometry based on two, more or less semi-circular, or slightly oval, and conically shaped glass delivery passages surrounding the gas orifice exit, and communicating respectively with the glass A and glass B compartments, is a better choice. This will be explained more fully later on, when dealing with the Design B of Spinner Assembly.

Volumetric flow rate $V_{dot}$ of molten glass through a rectangular slot can be calculated using the following equation:

$$V_{dot}=(WH^3 \Delta P)/(12 \mu L)$$

valid for Newtonian fluid, and W>10H; W being slot width, H is slot height and L is slot length in the direction of flow; $\Delta P$ is the applied pressure difference, and $\mu$ stands for molten glass viscosity. Since glass is a Newtonian fluid, its apparent dynamic or absolute viscosity $\mu$, i.e., the shear stress to shear rate ratio does not depend on the shear rate, so $\mu$ can be taken as constant. For a given slot width W, which comes from the circumference of the slot circular configuration, one has to specify the slot height H so the W>10H is true.

The pressure drop equations for a rectangular geometry slot and a circular orifice are as follows:
rectangular slot of infinite width; Navier-Stokes equation solved analytically:

$$\Delta P=12(L/(WH^3))\mu V_{dot}$$

from practical point of view valid for W>10H; circular orifice:

$$\Delta P=(128/\Pi)(L/D^4)\mu V_{dot}; \text{ Hagen-Poiseuille equation.}$$

If for the same pressure drop, $\Delta P$, one wishes to have equal volumetric flow rates through these two distinct orifice geometries, the following holds true:

$$128/(\Pi D^4)=12/(WH^3); W>10H$$

or $$128/(\Pi D^4)=12/(aH^4), \text{ for } W/H=a(a>10)$$

A standard spinner (single glass, solid fibre) orifices (holes) have diameter D=0.023", i.e., 0.6 mm. For a rectangular geometry slot, with a slot width to height ratio of 30 (thirty), a=W/H=30, the required slot height H to match the mass flow rate of molten glass through a 0.023" diameter orifice, for the same pressure drop (the same glass head), is 0.007". This 0.007" thick slot has to have the length (width W) of W=0.217" (5.5 mm), so the slot pitch diameter is 0.069" (1.8 mm). For a 0.023" (0.6 mm) central gas orifice, there will be about 0.5 mm wall thickness at the very exit of the central gas orifice (solid material between the gas orifice and the molten glass slot).

The mass flow rate formula for rectangular slot has been derived analytically for the infinite width slot. For slot shapes differing from the reference case of infinite width slot, some correction (shape) factors $f_p$ has to be used. Slot shape factors are usually given in the form of graphs, as a function of slot height to slot width ratio. This type of graph can be found, for example, in Michaeli W.: Extrusion Dies, New York, Carl Hanser Verlag 1984.

In FIGS. 4a and 4b, the left side of the drawing shows a symmetrical arrangement of centres. Fiberizing centres, i.e., the assemblies of molten glass slots with the associated central gas orifice, can be arranged in a vertically aligned and staggered configurations. A staggered configuration is the preferred one. The right sides of FIGS. 4a and 4b illustrate the situation with a staggered series of fiberizing centers. Horizontal layering of glasses A and B helps in achieving a reasonably high density of fiberizing centres on spinner peripheral wall.

Figure 5:
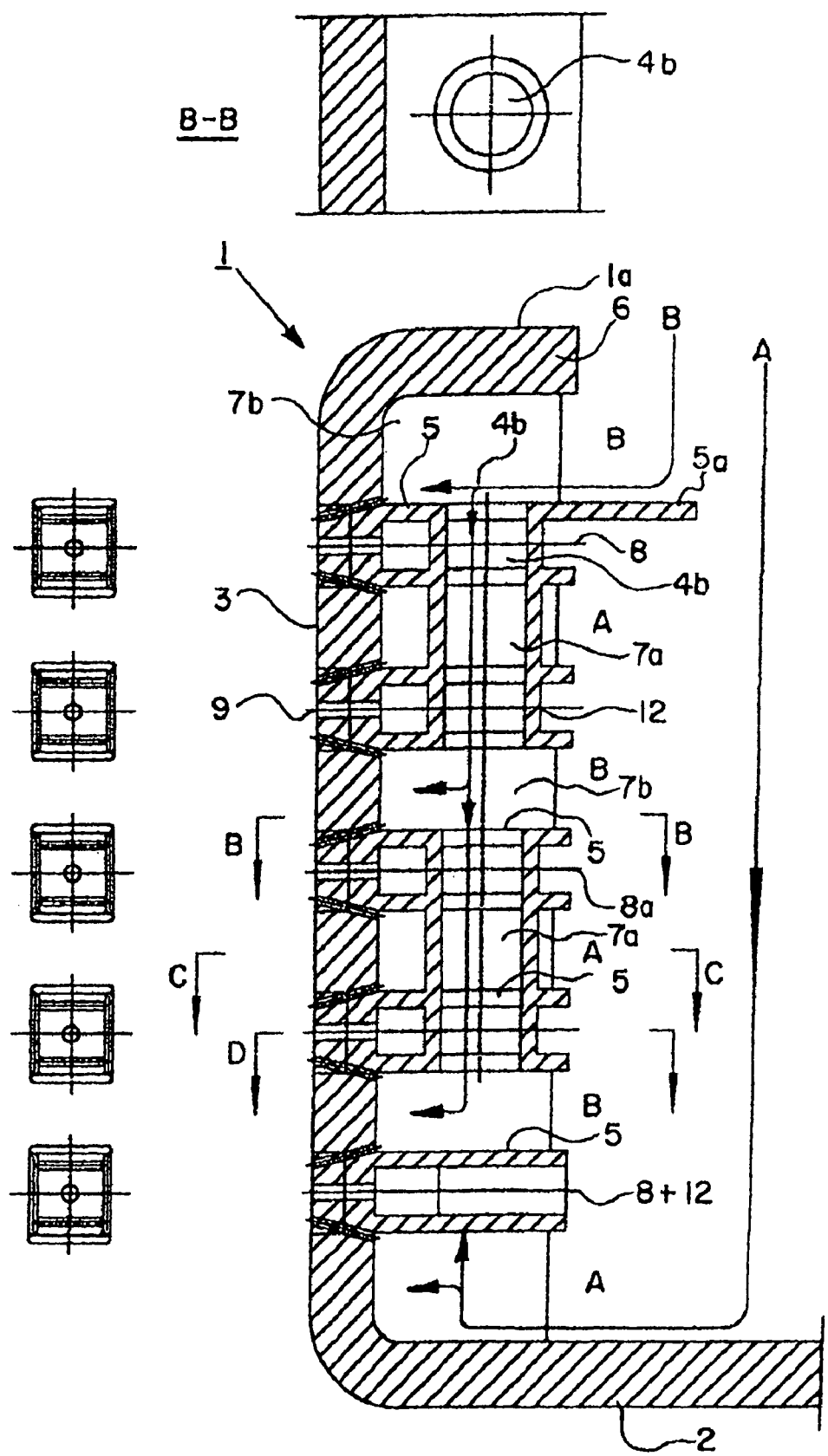
FIG. 5 is a repetition of FIG. 2, with further cross sections.
Figure 6:
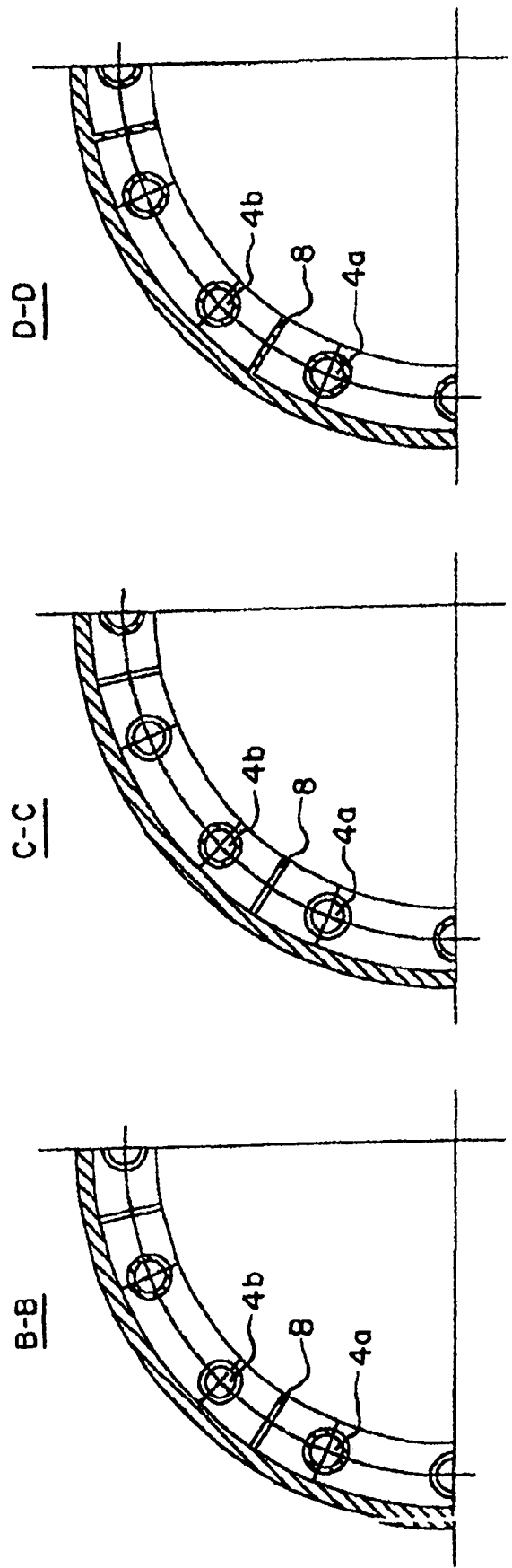
FIG. 6 shows a cross section B-B, C-C and D-D of FIG. 5.

FIG. 5 is similar to FIG. 2, giving the principle of the downward vertical distribution of glass B, additionally identifies the three cross-sections B-B, C-C and D-D, used to better visualize the circumferential distribution of glass A and glass B distributing passages as well as gas compartment vanes. Cross-sections B-B (through glass B compartment), C-C (through glass A compartment) and D-D (through gas compartment) are given in FIG. 6, being a counterpart of FIG. 3.

Figure 7:
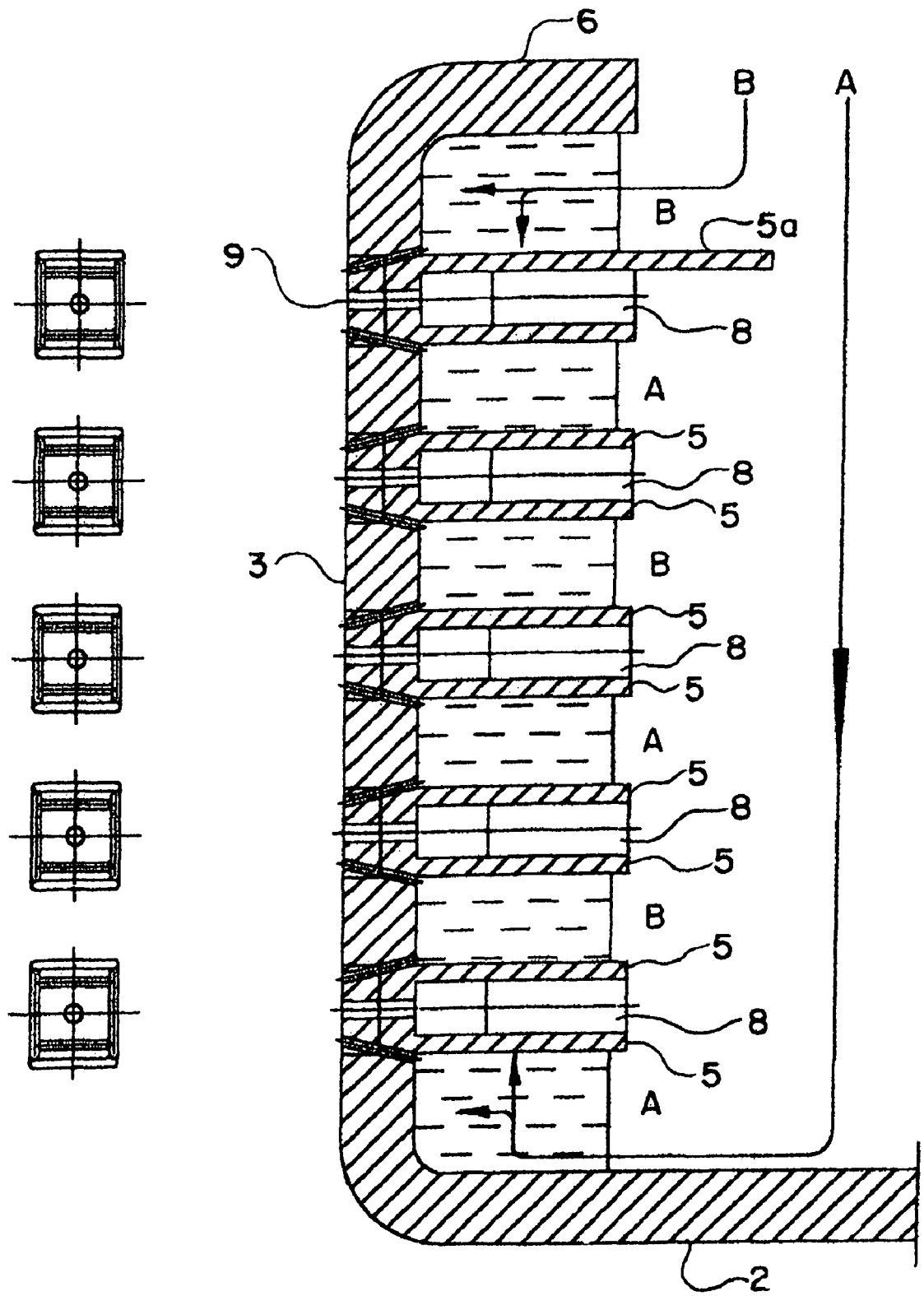
FIG. 7 is a radial section (vertical) close to the gas chamber vanes.

FIG. 7 gives some radial section close to the gas chamber vanes; vanes are visible, but not cut through. Communicating passages for glasses A and B are neither cut through nor visible glass heads for glass A and glass B shown.

Figure 7A:
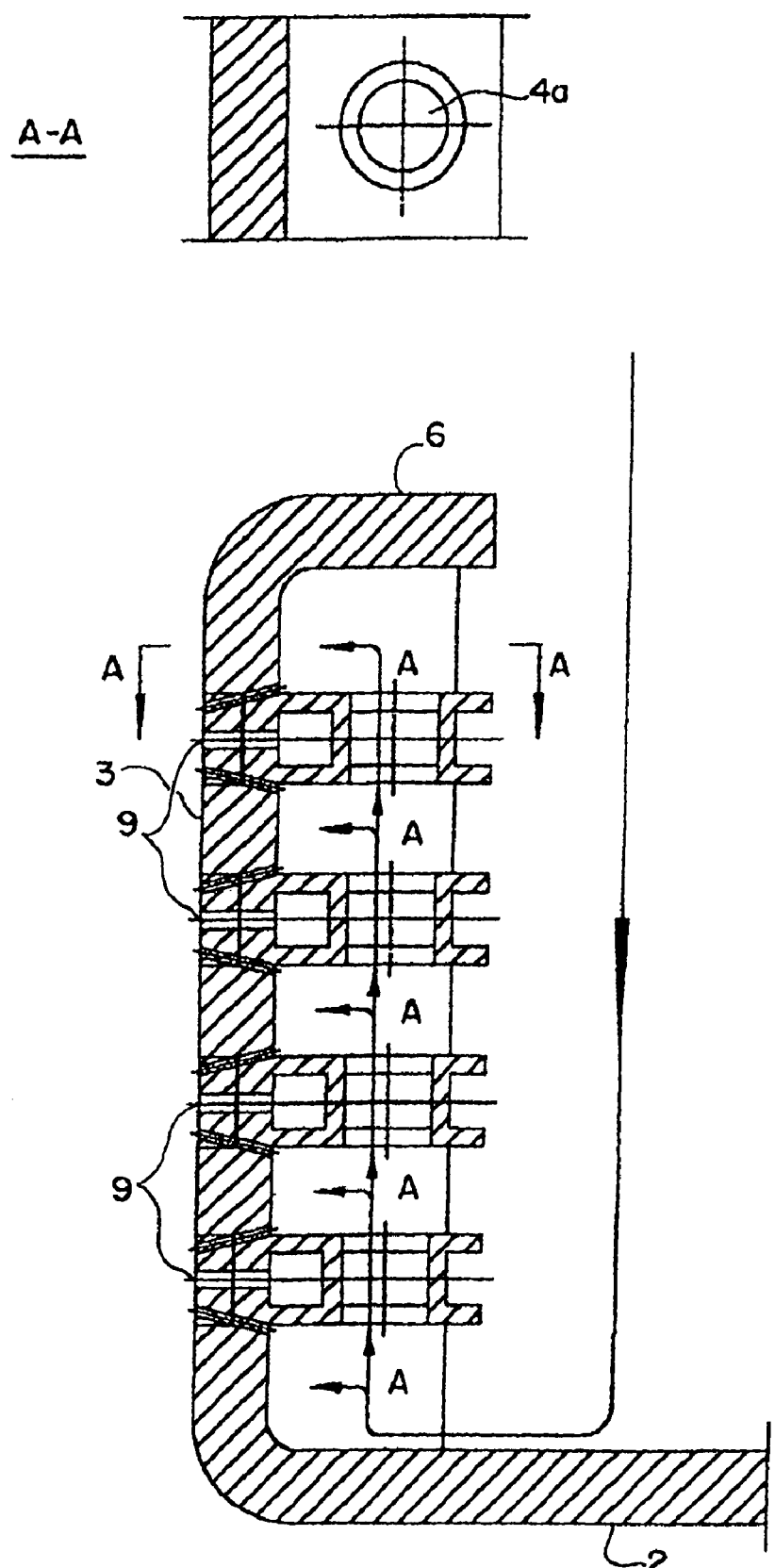
FIG. 7a is a cross section of a spinner suitable for making hollow single glass straight fibres.

The forgoing is a spinner design for making hollow dual-glass (curly) fibres. A slight design modification makes the spinner suitable for making hollow single-glass (straight) fibre. The governing principle is shown in FIG. 7a. Glass passages extend only through the gas chambers.

The aforementioned describes Design A of a spinner assembly, i.e. the spinner configuration where the spinner itself is made functionally responsible for distributing (horizontal layering) of glasses A and B, as well as self-generating the required gas pressure for the flow of gas through the gas orifices drilled in the spinner peripheral wall. It is fairly expensive to make such a multi-functional spinner assembly. A spinner is a consumable item, i.e., has a limited service life.

To lower spinner manufacturing cost by simplifying its design, glass A and B layering (distributing) and gas pressure generating can be done by a separate member. This can be used over and over, when replacing the spinners. This rationale leads to the Design B of our spinner assembly.

Spinner Assembly—Design B

Figure 8:
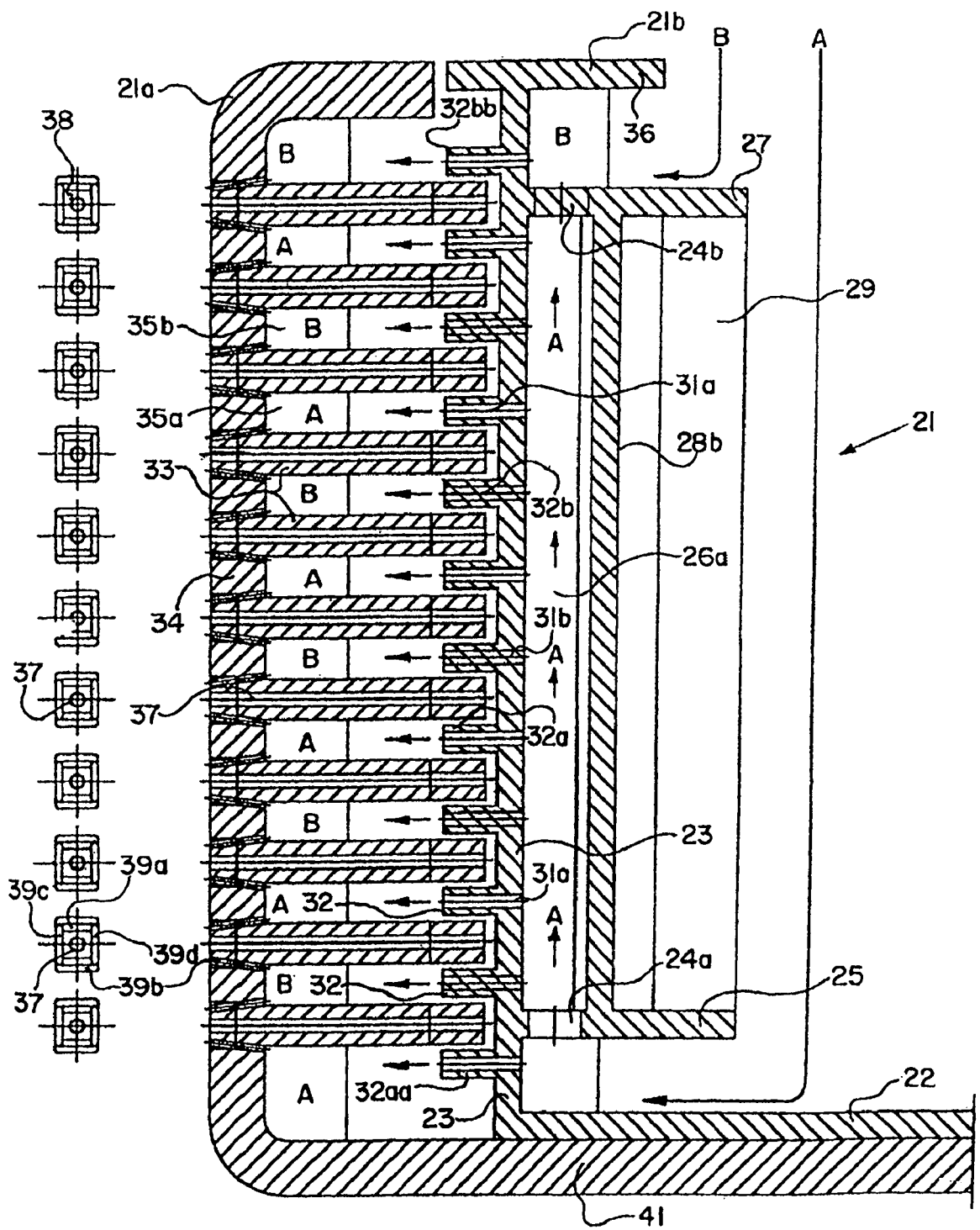
FIG. 8 is a partial, vertical cross section of a Design B spinner assembly.

FIG. 8 is a partial vertical section (cross-section) of the spinner assembly 21, which is the Design B of Spinner Assembly. Spinner assembly 21 physically consists of two separate members 21a and 21b bolted together (not shown in FIG. 8). The outer member 21a is the spinner itself, while the inner member 21b is a combined glass distributor and fan, responsible for horizontal layering of glasses A and B and generating the required gas pressure to force the gas through the gas orifices drilled in the spinner peripheral wall.

Two glasses, designated A and B, with sufficiently differing thermal expansion coefficients, are provided by a separate glass melter, forehearth and bushing systems. A stream of molten glass A enters the spinner assembly 21 somewhat closer to the spinner assembly centre line than the stream of molten glass B, and directly lands on the bottom 22 of the inner member 21b. Spinner assembly 21 rotates at rotational speed exceeding 2,000 rpm. By centrifugal action molten glass A is forced towards the inner member peripheral wall 23, and builds a layer (head) of glass A, along the inner member peripheral wall 23, by flowing upwards through a glass A slot 24aa in the bottom annular flange 25 of the inner member 21b.

Figure 9:
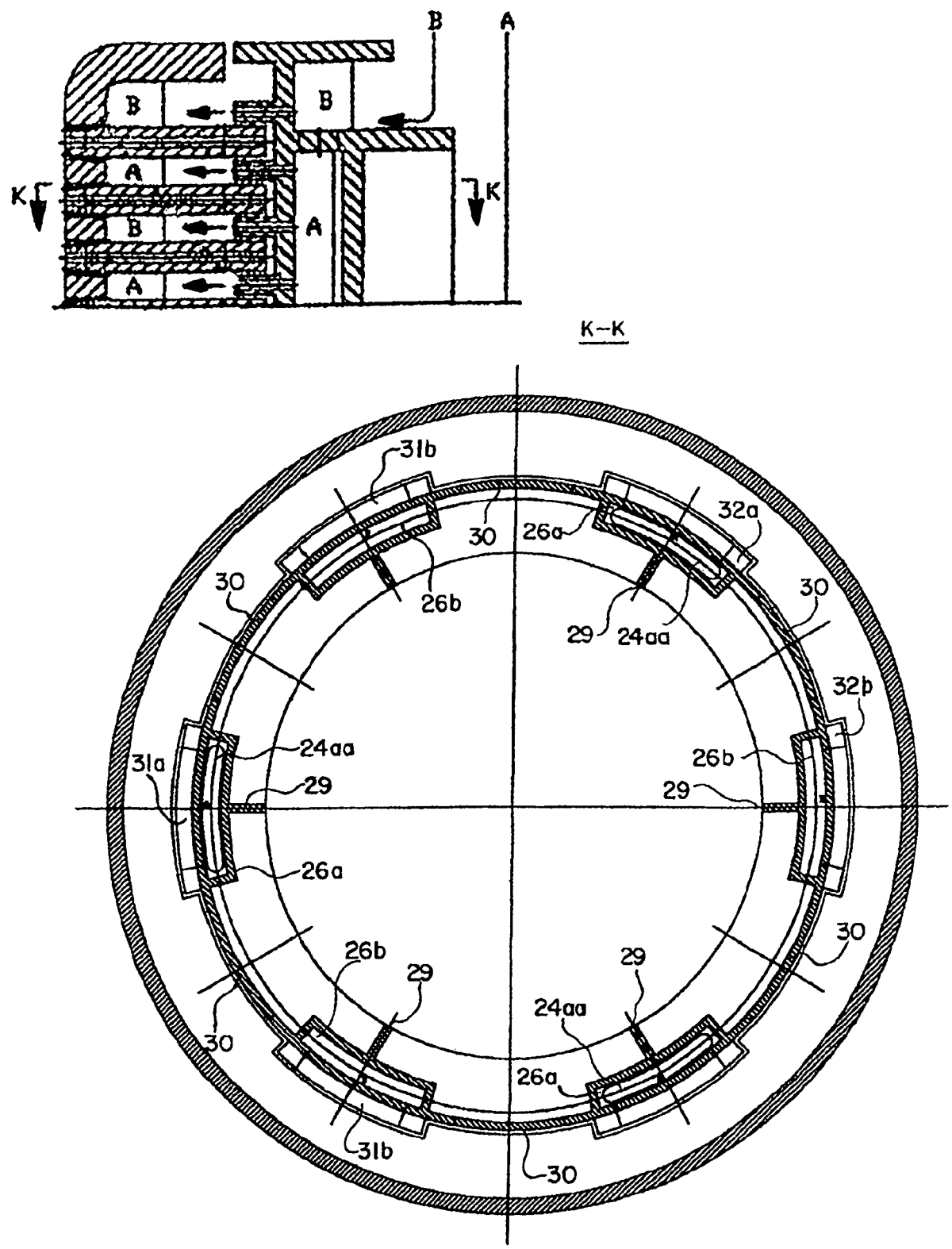

There are three such glass A slots 24a a shown in FIG. 9, FIG. 9 is a cross-section of spinner assembly 21, when the inner member 21b is being inserted into the outer member (spinner) 21a.

Figure 10:
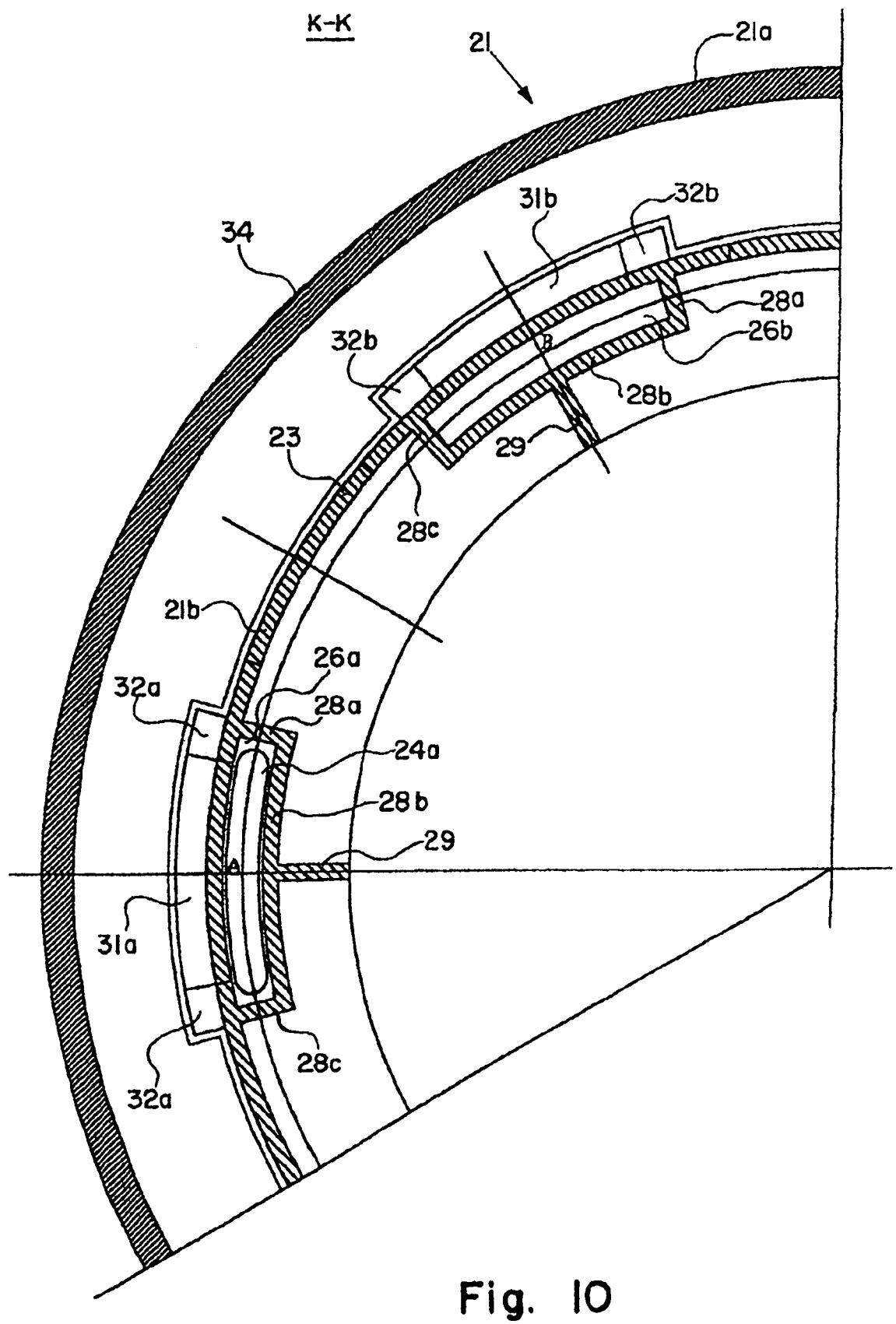
FIG. 10 is part of FIG. 9, showing neighbouring glass A and glass B vertical compartments 26a and 26b respectively.

FIG. 10 is part of FIG. 9, just giving the configuration of neighbouring glass A and glass B vertical compartments 26a and 26b, respectively.

In FIGS. 8, 9, and 10, glass A vertical compartment 26a is bound from the top by an intermediate annular flange 27 of the inner member 21b, and to the sides by three vertical walls 28a, 28b and 28c; glass A compartment is fed with the fresh molten glass A through the slot 24a in the bottom annular flange 25 of the inner member 21b. Vertical side wall 28b has a vertical and radial (radially extending) vane 29 attached to or integrated with it; the set of such vanes 29 (6(six) shown in FIG. 9) work as an impeller of a centrifugal radial blade geometry fan sucking in the inner burner combustion products from the spinner assembly central area and forcing them through the gas orifices 37 in the spinner 21a structure.

Three glass A vertical compartments 26a are shown in FIG. 9, each glass A compartment 26a extends 30 degrees in the circumferential direction. Symmetrically in between two neighbouring glass A compartments 26a there is located glass B compartment 26b. Glass B compartment 26b is of the same geometry as glass A compartment 26a. There are three glass B compartments 26b, so there is in total 6 (six) glass compartments. Glass compartments 26a and 26b are separated by high open area spaces 30, used for delivering an internal impeller pressurized combustion product to gas orifices 37 in the spinner 21a structure. There are six high open area spaces 30 shown in FIG. 9, each of them extending 30 degrees in the circumferential direction.

Glass A entering the glass A vertical compartment 26a through the bottom slot 24a in the bottom annular flange 25 of the inner member 21b flows upward along the peripheral wall 23, and builds a certain thickness layer of glass A over the glass A operational height of peripheral wall 23. This layer of certain thickness generates the centrifugal pressure to push the molten glass A through a series of glass A distributing slots 31a arranged along the height of the inner member 21b. Similar slots 31b are provided for glass B, and slots 31b are shifted by 60 degrees in circumferential direction with respect to slots 31a, as shown in FIG. 9. FIG. 8 is a vertical cross-section through slots 31a. Slots 31b, not being in this cross-section FIG. 8, are shown as dotted lines of in FIG. 8.

Slots 31a are made (milled) through the peripheral wall 23 of inner member 21b, and continue through the 30 degrees wide arc-shaped side projections 32a, integral with the inner member 21b peripheral wall 23. The reason for having these arc-shaped side projections 32a (and 32b for glass B) is to make sure that radially projected glass streams have nowhere else to go but right in between the corresponding annular rings 33 of spinner or outer member 21a. As previously mentioned, glass A layered vertically along the inner member 21b peripheral wall 23, distributes itself through a series of vertically spaced glass A slots 31a, and forms glass A horizontally layered spatial configuration along the spinner or outer member 21a height, on the inside peripheral wall 34 of the spinner 21. Every other outer member (spinner) 21a glass compartment 35a is filled with glass A; the neighbouring glass compartments 35b are filled with a different type of glass, i.e., glass B.

The mechanism of horizontally layering glass B is exactly the same as that for glass A, except, glass B is fed from the top, rather than from the bottom. A stream of molten glass B enters spinner assembly 21 further away from the spinner centre line than the stream of molten glass A, and lands on the radially extended intermediate annular flange 27 of the inner member 21b. Centrifugal force makes molten glass B flowing towards the inner member 21b peripheral wall 23. A certain thickness layer of molten glass B is formed along the peripheral wall 23 of the inner member 21b. Top annular flange 36 of the inner member 21b restricts the flow of molten glass B in the upward direction. Glass B is allowed to flow in the downward direction by entering the slot 24b in the intermediate annular flange 27. Slot 24b is shown in dotted lines in FIG. 8, enclosed. Glass B is made to occupy the glass B vertical compartments 26b. These compartments are bounded on the sides by three vertical walls 28a, 28b, and 28c, as shown in FIG. 10, and from the bottom by the bottom annular flange 25.

Glass B layer of sufficient thickness generates the required centrifugal pressure to push the molten glass B through a series of glass B distributing slots 31b arranged along the height of the inner member 21b; slots 31b are the same as slots 31a provided for glass A. As shown in FIG. 9, there is a 60 degrees circumferential shift between the two types of slots.

As previously mentioned, glass B layered vertically along the inner member 21b peripheral wall 23, is forced to flow through a series of vertically spaced glass B slots 31b, and form a horizontally layered and properly separated glass B spatial configuration along the spinner or outer member 21a height, on the inside of the spinner 21a peripheral wall 34, and between the spinner 21a horizontal annular rings 33.

Horizontal and alternate layering of glasses A and B along the spinner 21a height can be accomplished the way just described.

Inner glass distributor-fan member 21b has a set of inner radial vanes 29. Six are shown in FIG. 9, integrated with the inner member 21b structure. Vanes 29 are of full vertical height. FIG. 9 depicts vanes 29 of full radial length, while vanes 29 shown in FIG. 8 are a bit shorter than the radial space allows. This gives some flexibility in matching the required gas flow to make hollow fibre.

Inner burners (not shown) are used to heat the spinner assembly 21. Usually inner burners are used only to heat-up the spinner structure before dropping the molten glass. After the inner burners are shut-off, the spinner is heated by a main outer annular burner (not shown) and the hot molten glass stream. Hybrid fiberizer designs with both outer main annular and inner burners working all the time is what the present hollow fibre spinner design uses.

After mounting the spinner assembly 21 for operation, its inner space becomes largely enclosed. Burning a fuel-air mixture in a set of stationary inner burners produces gaseous combustion products, which will exit the spinner 21 structure mostly through a multiplicity of gas orifices 37 provided within spinner circular annular rings 33 of spinner member 21a. The pressure of inner burner(s) combustion products inside the spinner inner member 21b, can be generated or built-up this way.

Figure 11B:
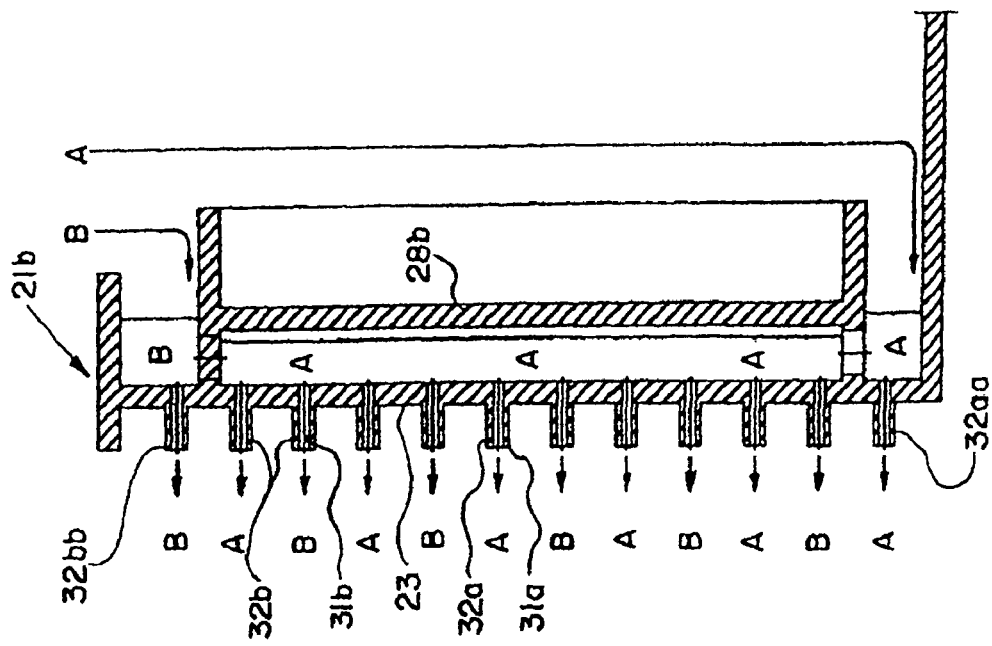
FIG. 11b is a partial cross section of inner member 21b for also making fibres of both glass A and glass B.
Figure 11A:
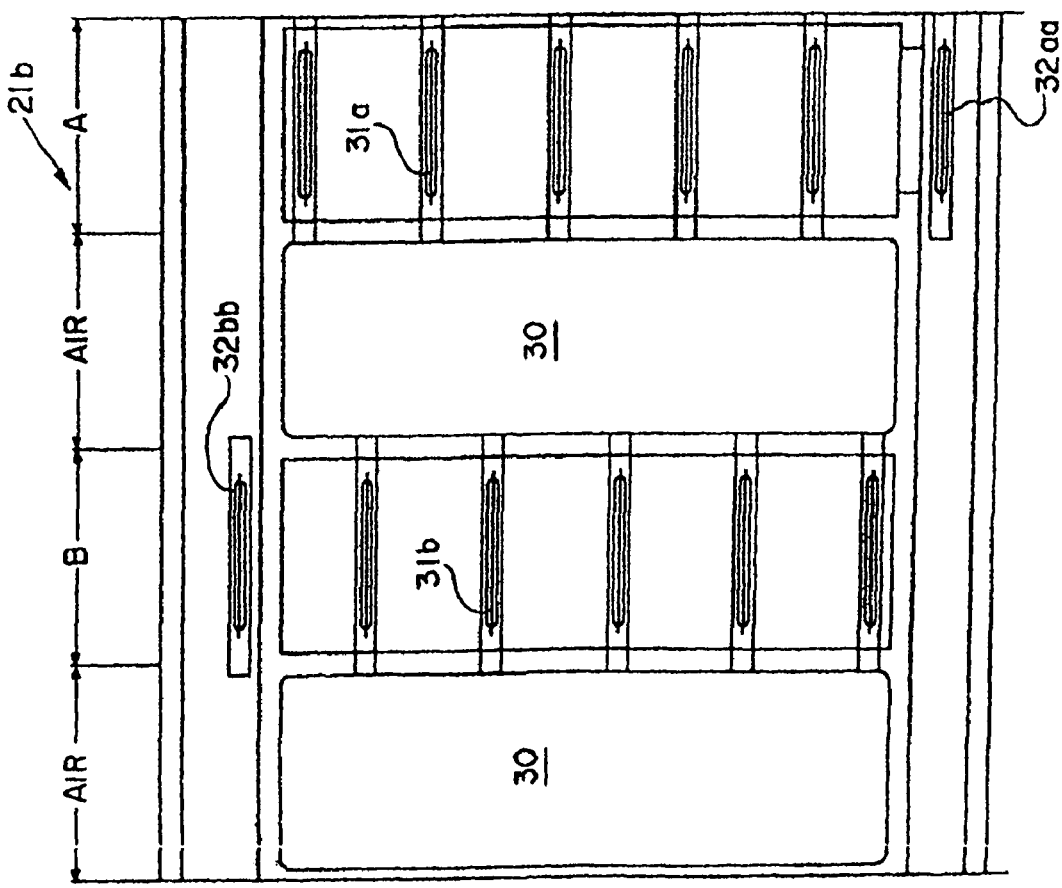
FIG. 11a is a partial, schematic section of the Design B inner component spinner part 21b for making fibres of both glass A and glass B.

FIG. 11a is a partial development of design B inner glass distributor-fan member 21b, as viewed from the spinner periphery looking towards the spinner axis. A partial cross-section of the inner member 21b is shown in FIG. 11b. FIG. 11 refers to the design for two separate glasses A and B.

Figure 12B:
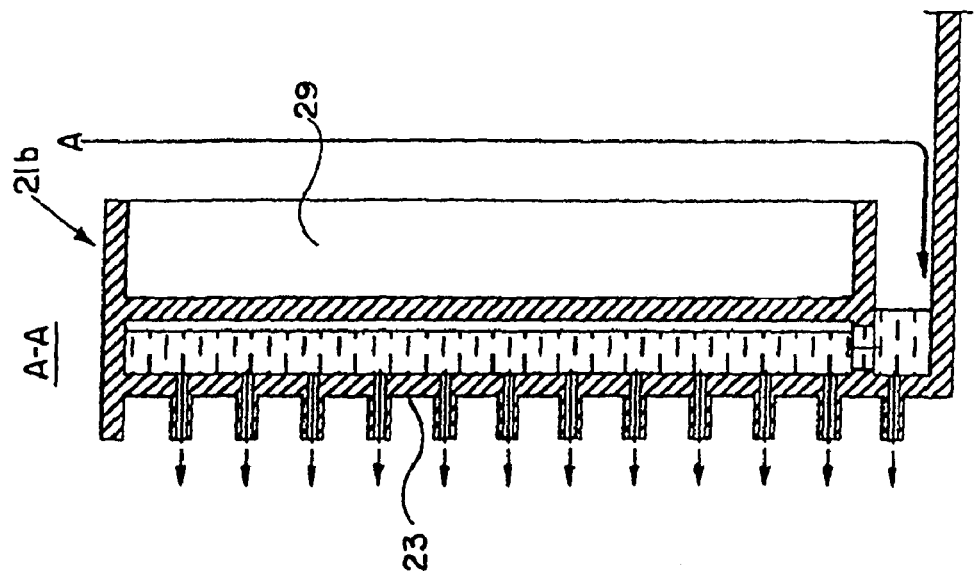
FIGS. 12a and 12b are similar views as shown in FIG. 11a and FIG. 11b respectively, with the exception that spinner 21 here uses only one glass, i.e. glass A and makes straight hollow fibres.
Figure 12A:
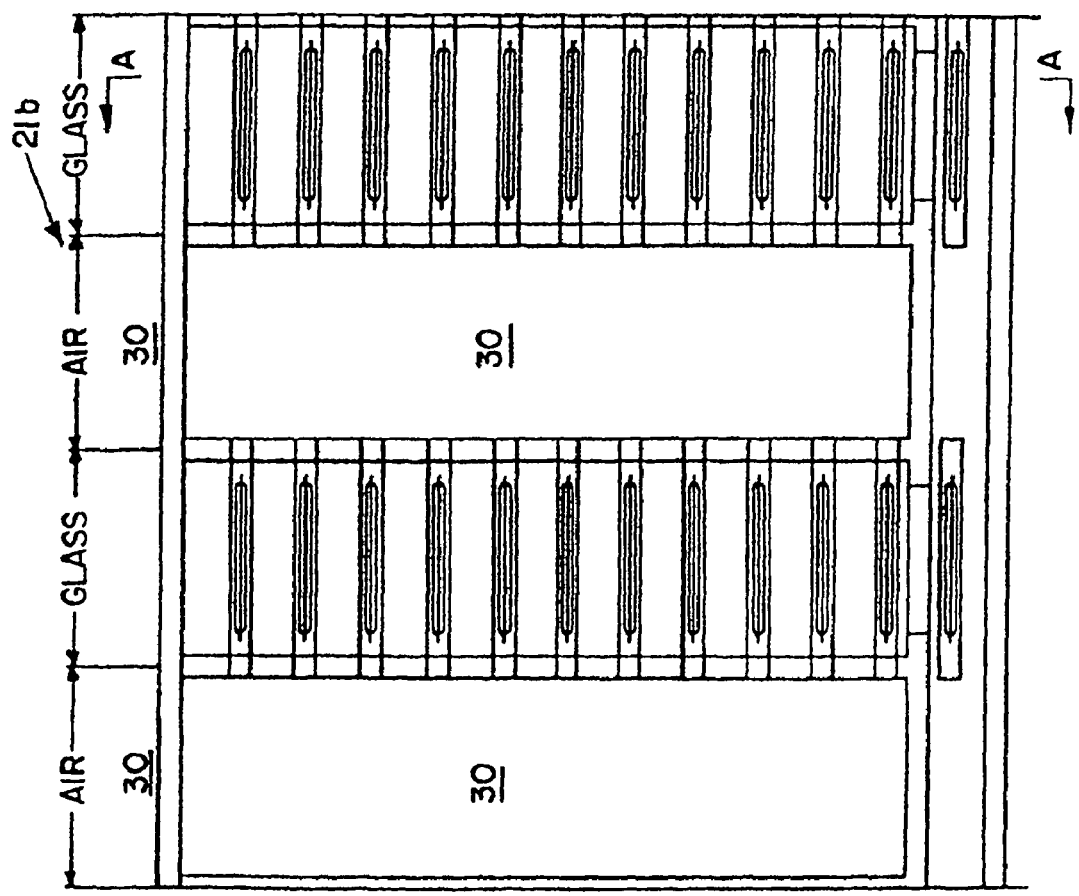

FIGS. 12a and 12b are counterparts of FIGS. 11a and 11b, and disclose the inner member 21b design for making a single-component hollow insulation-type glass fibre, by a rotary process. Inner member 21b, equipped with a set of internal vanes 29, and rotating at high rotational speed, 2,500 rpm, works like a fan, inner member 21b being kind of impeller. Combustion products coming from the inner burners are at first sucked in and then pressurized by a rotating vane structure 21b. Pressurized combustion products are made to flow through the high open area zone 30 of the inner member peripheral wall 23.

Between the neighbouring vertical compartments, the high open area zone 30, marked "AIR" in FIGS. 11a and 12a. Due to strength, deformation, etc. constraints, it can be made as a multi-slotted design, but still having a high percentage open area to minimize the resistance against the flow of combustion products through it.

Turning back to FIGS. 8, 9, and 10, pressurized combustion products reach the internal space between the outer and inner members 21a and 21b, respectively, and exit through a plurality of gas orifices 37 in spinner circular (annular) rings 33. This flow of pressurized gas through centrally located gas orifices 37 makes manufacturing of hollow glass fibre possible by preventing the surface tension driven collapse of freshly formed and still liquid primary hollow fibre structure.

A continuous flow of hot, inner burner generated, combustion products through the spinner assembly 21 internal structure minimizes the danger of excessive cooling the molten glass mass inside the spinner assembly 21.

Figure 13:
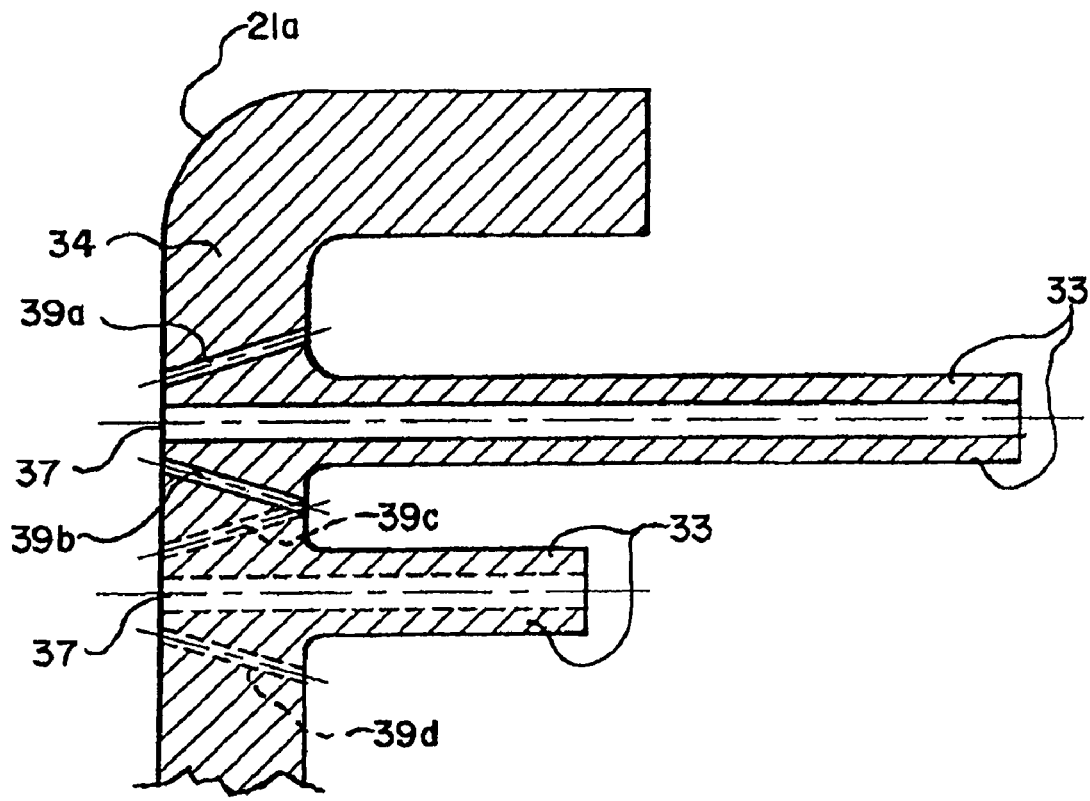
FIG. 13 is a partial, vertical cross section of spinner outer member 21a along with two perpendicularly cross sectional, outside and inside views.
Figure 13:
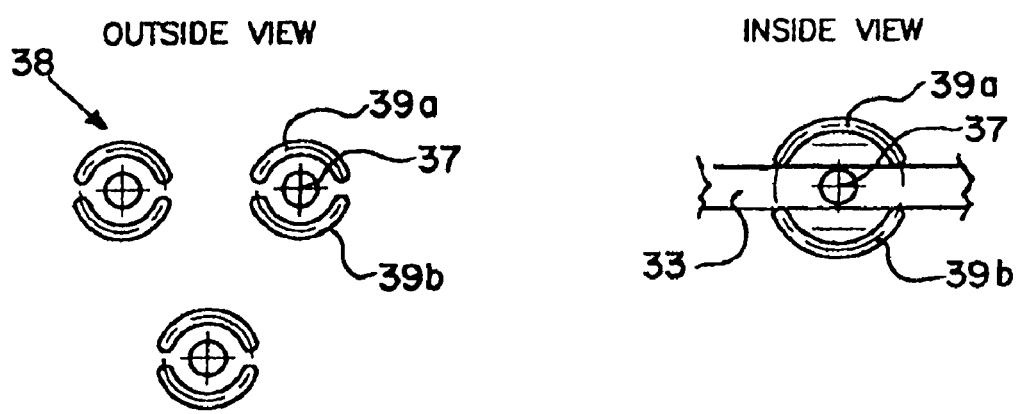

In FIG. 13, peripheral wall 34 of spinner 21a, shown in, has on its inner side a multiplicity of spaced, and reasonably thin, annular or circular rings 33. These annular rings 33 provide physical barriers for separating the neighbouring A and B glasses, in the case of making a bi-component glass fibre. The horizontal arrangement of annular rings 33 makes the horizontal layering of glasses A and B along the spinner height possible. Horizontal layering has more potential in fitting a larger number of fiberizing centers into a given diameter spinner, than vertical layering used in prior art devices.

A single column/row of fiberizing centres 38 is shown in FIG. 8. A fiberizing centre 38 comprises a central air orifice 37, enclosed by the top molten glass slot 39a, bottom molten glass slot 39b, and two side slots 39c and 39d. The fact that the fiberizing centre 38 has an upper slot 39a and a bottom slot 39b has nothing to do with regard to the entry of glass A and glass B. Molten glass, glasses A or B, will exit through a rectangular shape top slot 39a, laser drilled through the spinner peripheral wall 34. Top slot 39a is drilled under an angle, so glass A or glass B can be delivered close enough to the gas orifice 37 exit If glass B is in a compartment above centre 38, glass B will enter by slot 39a. Molten glass B will flow through the bottom rectangular slot 39b only if it is stored in a compartment below orifice 37. Slots 39a and 39b are shown as being of the same geometry, and symmetrical with respect to the central air orifice 37. Slots 39a and 39b deliver glasses A and B to horizontal slot exits, which allows glasses A and B to be more uniformly spread around the central gas orifice 37. Two vertical blind side slots 39c and 39d are drilled on the both sides of the central gas orifice 37. As shown here, side slots 39c and 39d are only drilled half the way through the spinner peripheral wall.

It is desirable to surround the central air (gas) orifice 37 with the two molten glasses as completely as practical. Having a circular cross-section gas orifice 37, it is possible to use a quasi-circular geometry of molten glass slots 39. Two, more or less conically shaped glass delivery slots or passages 39 can almost completely surround the gas orifice 37 in the spinner peripheral wall. Products of combustion, coming from the stationary inner burners, exit through the gas orifices 37, and prevent just formed, still hot, and fairly fluid, molten glass primary fibre hollow shape, from collapsing. FIG. 13 illustrates this.

Figure 14:
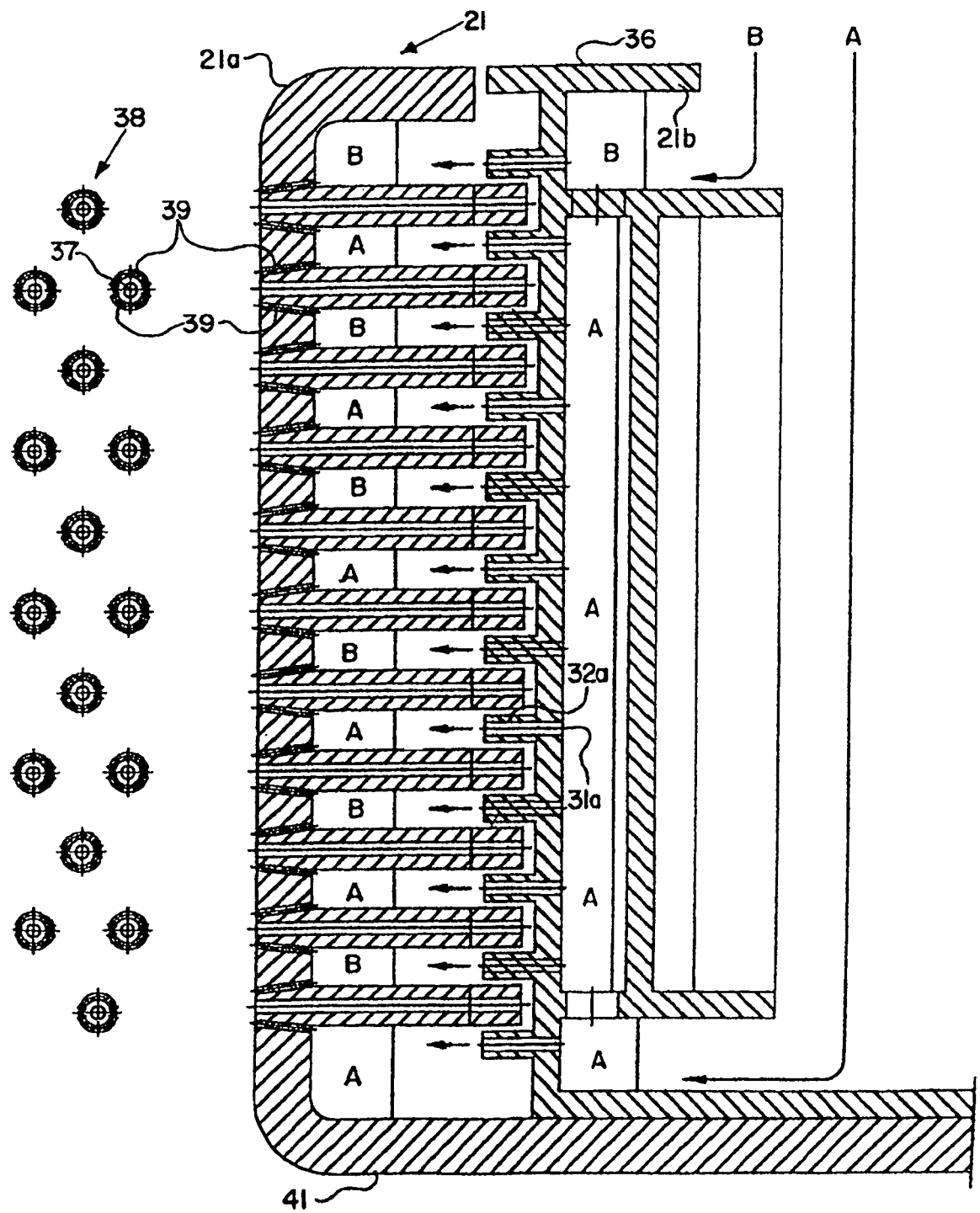
FIG. 14 is a similar drawing to that shown in FIG. 8, with the exception that fiberizing centres (38) are arranged in a staggered manner.

FIG. 14, being a counterpart of FIG. 8, is a partial vertical section (cross-section) of the spinner assembly 21, i.e., the Design B-Spinner Assembly, where the fiberizing centres 38 comprise conical molten glass slots 39, and fiberizing centres 38 are arranged in a staggered pattern.

Figure 15:
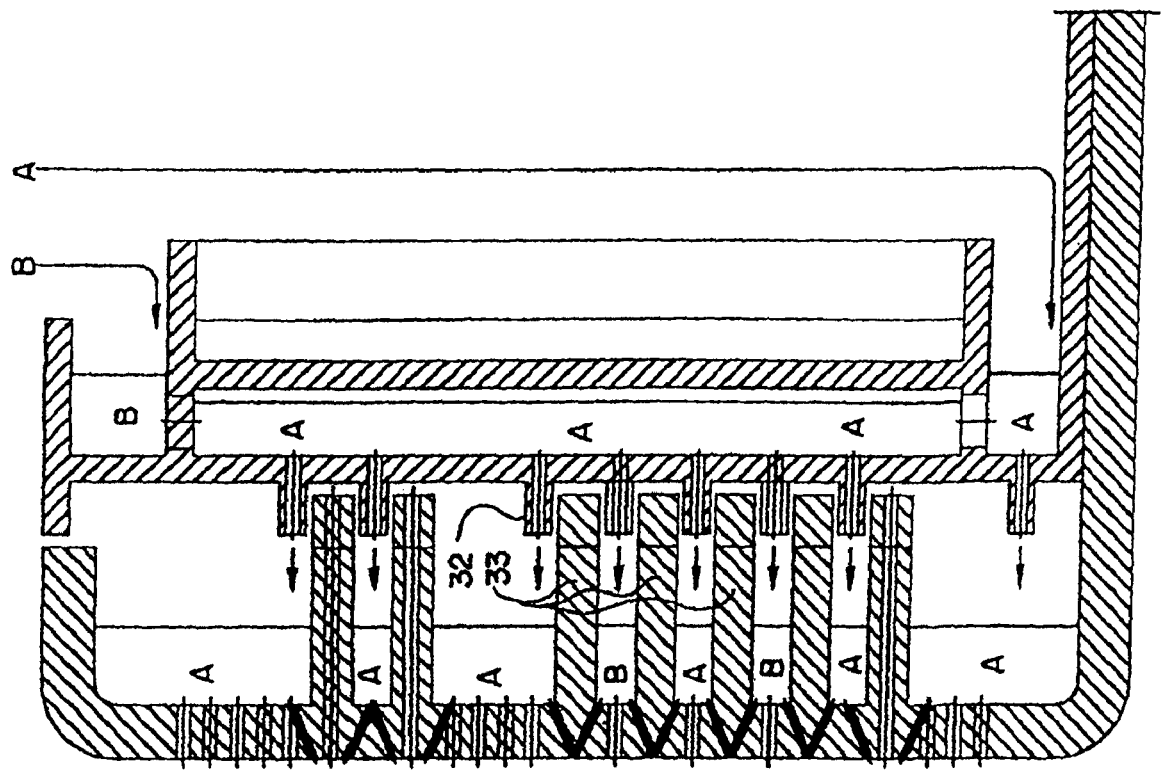
FIG. 15 is a vertical cross section of a two-component spinner assembly 21a and 21b, with further information thereon.

In FIG. 15, a vertical cross section of a two-component spinner, illustrates a hybrid spinner design for making various mixtures of:

glass A, straight, solid (standard) fibre:
    800 holes per row, 5+4+1+3=13 rows, 13*800=10,400 holes glass A, straight, hollow fibre:
    250 holes per row, 2+1=3 rows, 3*250=750 holes glass A+B, curly, solid fibre:
    800 holes per row, 1+1+1+1=4 rows, 4*800=3,200 glass B, straight, solid (standard) fibre:
    800 holes per row, 1+1=2 rows, 2*800=1,600 holes.

The hole pattern, given in FIG. 15, is an example. The number of holes per row refers to a 15-inch diameter spinner, the spinner diameter used by the inventor. If required, one can drill 850 to 900 holes per row for a single-glass and dual-glass solid fibres, rather than 800, shown in FIG. 15.

Fibres are layered (mixed) in the top to bottom direction, and right during the fibre forming stage. Obviously, other top to bottom fibre distributions are possible.

This spinner illustrated in FIG. 15 can manufacture an enhanced performance standard product, with no sacrifice in throughput capacity. The bulk of the fibrous insulation produced is a straight and solid, i.e., standard glass fibre, (glass A=10,400 holes, glass B=1,600 holes, this product comprises 75% (by mass) of standard fibres).

Hollow fibre is to improve the product thermal performance. To lower the product density for a given R-value, there is provided 750 holes for making glass A hollow fibre. Hollow fibre will constitute slightly less than 5% of product mass. Irregularly-shaped dual-glass fibre is primarily for substantially increasing the allowable compression ratio. In the hybrid spinner, 3,200 holes are for making dual-glass (A+B) solid, irregularly-shaped, 20% by mass, of curly fibres.

In summary, presently used 15-inch diameter spinners for making single-glass straight and solid fibre have 22 rows of holes. Each row has 800 laser drilled holes. The total hole count is then 22*800=17,600 holes. These spinners run at 1,200 to 1,250 lbs/hr throughput. The mixed fibre 15-inch spinner has 15,950 holes. If one drilled 900 holes per row, for the single glass rows only, then the total number of holes would reach 15,950+15*100=17,450. This is comparable to the present standard spinners. The number of holes per row for dual-glass fibre can be 850, for example, rather than 800. With the mixed spinner design disclosed in FIG. 15, one can match the throughput capacity of existing spinners (1,250 lbs/hr).

As shown in FIG. 8, FIG. 14 and FIG. 15, the arc-shaped projections 32 are located in between the annular rings 33 of the spinner. This is done so the molten glass mass exiting the slots 31 is positively confined to the space between the neighbouring top and bottom annular rings 33 of the spinner.

Assembly of the Design B Spinner

Figure 16:
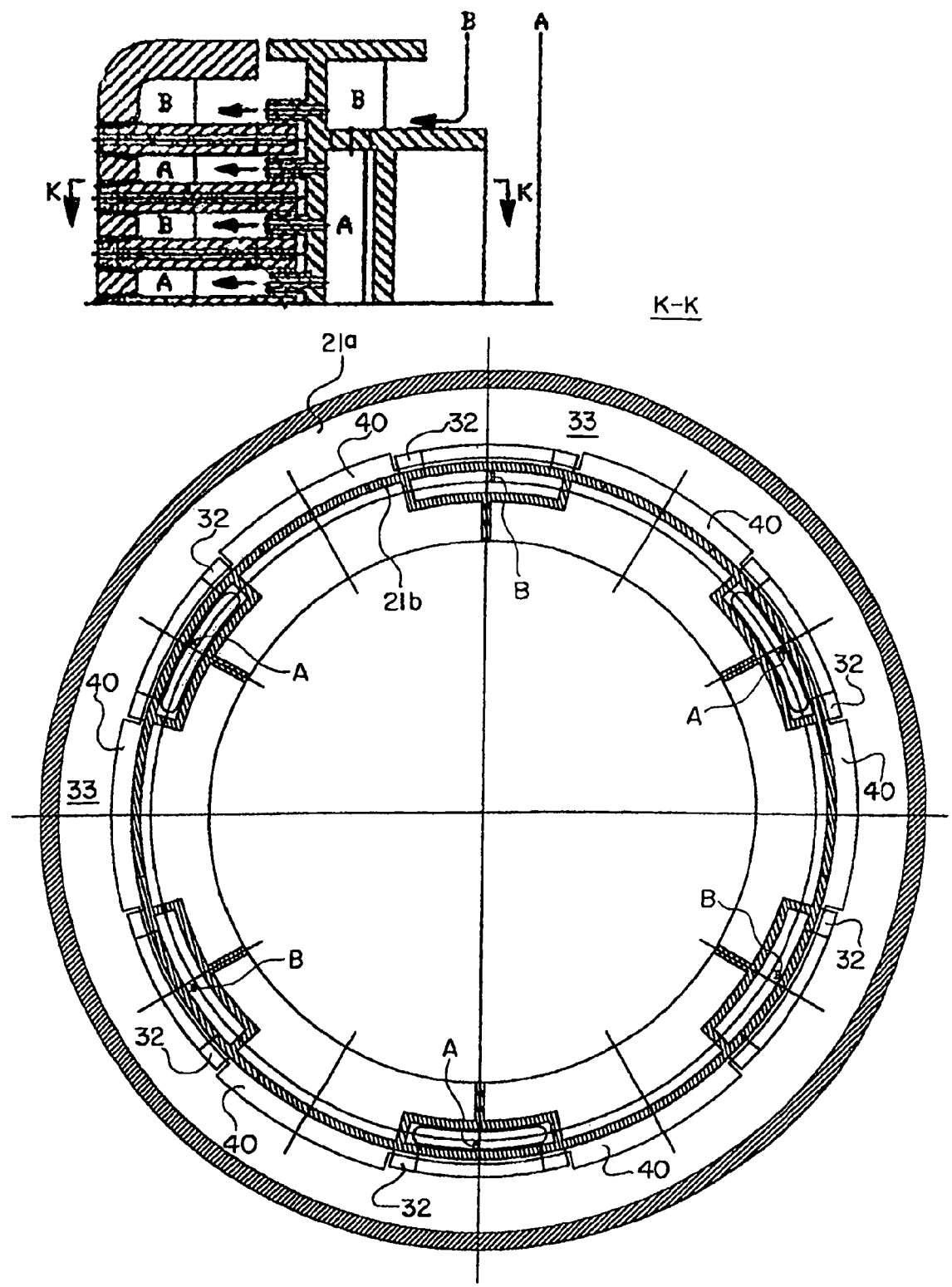
FIGS. 16 and 17 are horizontal cross sections of spinner 21 showing parts 21a and 21b assembly process.
Figure 17:
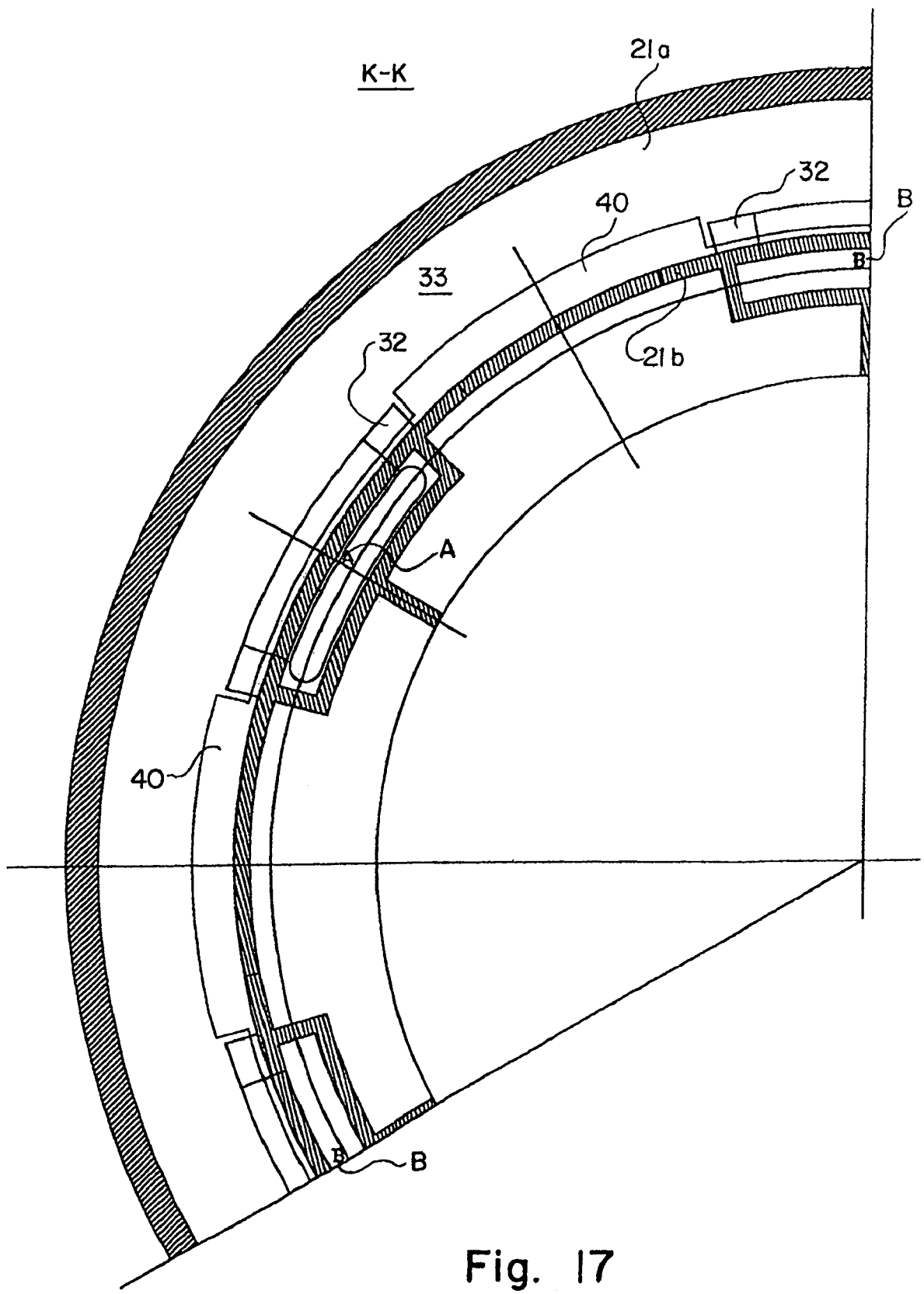

The process of assembling the parts 21a and 21b for operation follows in conjunction with FIGS. 16 and 17.

The inner member 21b has a set of the arc-shaped projections 32 spread uniformly over the 360 degrees angle; six such arc-shaped projections 32 are shown in FIG. 9; there are twelve rows of such projections 32, top to bottom, as shown in FIG. 8; having twelve rows of projections 32. What is important, is that the rows of projections 32 are vertically aligned, in the top to bottom direction. This is required for proper assembly.

The outer member 21a has a set of the arc-shaped cut-outs 40 in each of its annular rings 33; the geometry of these cut-outs 40 corresponds to the geometry of the arc-shaped projections 32 of the inner member 21b; there is six such cut-outs 40 shown in FIGS. 16 and 17. Cut-outs 40 are vertically aligned, and are made slightly larger than the arc-shaped projections 32 to make an easier assembly.

The process of assembling members 21a and 21b is as follows:

Aligning the inner member 21b with respect to the outer member 21a. Aligning means such that the arc-shaped projections 32 of the inner member 21b fit into the arc-shaped cut-outs 40 of the outer member 21a. As shown in FIG. 9, and in larger scale in FIG. 10.

Pushing in the inner member 21b, so finally it is prevented further downward movement by the bottom 41 of the outer member 21a. Rotating the inner member 21b with respect to the outer member 21a so the arc-shaped projections 32 of the inner member 21b will be positioned right in between the arc-shaped cut-outs 40 of the outer member 21a, as shown in FIG. 16 (FIG. 17 shows it in a larger scale). Securing the relative positioning of members 21a and 21b by means of bolting them together (not shown), generally on the spinner floor.

The invention claimed is:

1. A rotatable spinner assembly for making insulating hollow glass fibers, comprising:
   a peripheral wall;
   gas-receiving compartments along the peripheral wall for receiving heated gas under pressure, wherein the gas-receiving compartments have respective gas orifices which exit through the peripheral wall to transmit the heated gas under pressure;
   glass-receiving first compartments along the peripheral wall to receive molten first glass material, and glass-receiving second compartments along the peripheral wall to receive molten second glass material, wherein each of the glass-receiving first compartments extends horizontally along the peripheral wall, and each of the glass-receiving first compartments is adjacent multiple said gas-receiving compartments, the multiple said gas-receiving compartments have corresponding multiple said respective gas orifices, and each of the glass-receiving first compartments has respective first slots adjacent the corresponding multiple said respective gas orifices;
   the glass-receiving first compartments having respective first slots through the peripheral wall to transmit the molten first glass material, and the glass-receiving second compartments having respective second slots through the peripheral wall to transmit the molten second glass material, wherein the respective first slots and the respective second slots are adjacent respective gas orifices to combine the molten first glass material and the molten second glass material with the heated gas under pressure and form insulating hollow glass fibers;
   the glass-receiving first compartments being connected to upwardly extending first passages;
   a bottom in the spinner assembly to receive the molten first glass material, wherein a centrifugal force by rotation of the spinner assembly urges the molten first glass material to flow radially outward along the bottom toward peripheral wall, and upward through the upwardly extending first passages, and into the first compartments, and out the first slots to combine with the heated gas under pressure;
   the glass-receiving second compartments being connected to downwardly extending second passages;
   an upper annular flange in the spinner assembly to receive the molten second glass material, wherein said centrifugal force by rotation of the spinner assembly urges the molten second glass material to flow radially outward along the upper annular flange toward the peripheral wall, and downward through the downwardly extending second passages, and into the second compartments, and out the second slots to combine with the heated gas under pressure.

2. The rotatable spinner assembly of claim 1, wherein each of the gas-receiving compartments is between a glass-receiving first compartment and a glass-receiving second compartment.

3. The rotatable spinner assembly of claim 1, wherein the glass-receiving first compartments and the glass-receiving second compartments alternate in succession on the peripheral wall.

4. A rotatable spinner assembly for making insulating hollow glass fibers, comprising:
   a peripheral wall;
   gas-receiving compartments along the peripheral wall for receiving heated gas under pressure, wherein the gas-receiving compartments have respective gas orifices which exit through the peripheral wall to transmit the heated gas under pressure;
   glass-receiving first compartments along the peripheral wall to receive molten first glass material, and glass-receiving second compartments along the peripheral wall to receive molten second glass material, wherein each of the glass-receiving second compartments extends horizontally along the peripheral wall, and each of the glass-receiving second compartments is adjacent multiple said gas-receiving compartments, the multiple said gas-receiving compartments have corresponding multiple said respective gas orifices, and each of the glass-receiving second compartments has respective second slots adjacent the corresponding multiple said respective gas orifices;
   the glass-receiving first compartments having respective first slots through the peripheral wall to transmit the molten first glass material and the lass-receiving second compartments having respective second slots through the peripheral wall to transmit the molten second glass material, wherein the respective first slots and the respective second slots are adjacent respective gas orifices to combine the molten first glass material and the molten second glass material with the heated gas under pressure and form insulating hollow glass fibers;

the glass-receiving first compartments being connected to upwardly extending first passages;

a bottom in the spinner assembly to receive the molten first glass material, wherein a centrifugal force by rotation of the spinner assembly urges the molten first glass material to flow radially outward along the bottom toward peripheral wall, and upward through the upwardly extending first passages, and into the first compartments, and out the first slots to combine with the heated gas under pressure;

the glass-receiving second compartments being connected to downwardly extending second passages;

an upper annular flange in the spinner assembly to receive the molten second glass material, wherein said centrifugal force by rotation of the spinner assembly urges the molten second glass material to flow radially outward along the upper annular flange toward the peripheral wall, and downward through the downwardly extending second passages, and into the second compartments, and out the second slots to combine with the heated gas under pressure.

5. A rotatable spinner assembly for making insulating hollow glass fibers, comprising:

a peripheral wall;

gas-receiving compartments along the peripheral wall for receiving heated gas under pressure, wherein the gas-receiving compartments have gas orifices which exit through the peripheral wall to transmit the heated gas under pressure, wherein each of the gas-receiving compartments extends horizontally along the peripheral wall, and each of the gas-receiving compartments has multiple said gas orifices which exit through the peripheral wall;

glass-receiving first compartments along the peripheral wall to receive molten first glass material, and glass-receiving second compartments along the peripheral wall to receive molten second glass material;

the glass-receiving first compartments having respective first slots through the peripheral wall to transmit the molten first glass material, and the glass-receiving second compartments having respective second slots through the peripheral wall to transmit the molten second glass material, wherein the respective first slots and the respective second slots are adjacent respective gas orifices to combine the molten first glass material and the molten second glass material with the heated gas under pressure and form insulating hollow glass fibers;

the glass-receiving first compartments being connected to upwardly extending first passages;

a bottom in the spinner assembly to receive the molten first glass material, wherein a centrifugal force by rotation of the spinner assembly urges the molten first glass material to flow radially outward along the bottom toward peripheral wall, and upward through the upwardly extending first passages, and into the first compartments, and out the first slots to combine with the heated gas under pressure;

the glass-receiving second compartments being connected to downwardly extending second passages;

an upper annular flange in the spinner assembly to receive the molten second glass material, wherein said centrifugal force by rotation of the spinner assembly urges the molten second glass material to flow radially outward along the upper annular flange toward the peripheral wall, and downward through the downwardly extending second passages, and into the second compartments, and out the second slots to combine with the heated gas under pressure.

6. A rotatable spinner assembly for making insulating hollow glass fibers, comprising:

a peripheral wall;

gas-receiving compartments along the peripheral wall for receiving heated gas under pressure, wherein the gas-receiving compartments have gas orifices which exit through the peripheral wall to transmit the heated gas under pressure;

glass-receiving first compartments along the peripheral wall to receive molten first glass material, and glass-receiving second compartments along the peripheral wall to receive molten second glass material;

the glass-receiving first compartments having respective first slots through the peripheral wall to transmit the molten first glass material, and the glass-receiving second compartments having respective second slots through the peripheral wall to transmit the molten second glass material, wherein the respective first slots and the respective second slots are adjacent respective gas orifices to combine the molten first glass material and the molten second glass material with the heated gas under pressure and form insulating hollow glass fibers;

the glass-receiving first compartments being connected to upwardly extending first passages;

a bottom in the spinner assembly to receive the molten first glass material, wherein a centrifugal force by rotation of the spinner assembly urges the molten first glass material to flow radially outward along the bottom toward peripheral wall, and upward through the upwardly extending first passages, and into the first compartments, and out the first slots to combine with the heated gas under pressure;

the glass-receiving second compartments being connected to downwardly extending second passages;

an upper annular flange in the spinner assembly to receive the molten second glass material, wherein said centrifugal force by rotation of the spinner assembly urges the molten second glass material to flow radially outward along the upper annular flange toward the peripheral wall, and downward through the downwardly extending second passages, and into the second compartments, and out the second slots to combine with the heated gas under pressure; and radial vanes extending from the peripheral wall, wherein the radial vanes separate adjacent said glass-receiving first compartments, and the radial vanes separate adjacent said glass-receiving second compartments, and the radial vanes separate adjacent said gas-receiving compartments.

* * * * *